(12) United States Patent
Barnes et al.

(10) Patent No.: US 8,718,436 B2
(45) Date of Patent: May 6, 2014

(54) METHODS, APPARATUSES FOR PROVIDING SECURE FIBER OPTIC CONNECTIONS

(75) Inventors: Ray S. Barnes, Hickory, NC (US); Dave E. Cunningham, Conover, NC (US); Bernhard A. Deutsch, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 202 days.

(21) Appl. No.: 12/871,052

(22) Filed: Aug. 30, 2010

(65) Prior Publication Data
US 2012/0051707 A1 Mar. 1, 2012

(51) Int. Cl.
- *G02B 6/00* (2006.01)
- *G02B 6/36* (2006.01)
- *G02B 6/44* (2006.01)

(52) U.S. Cl.
CPC ............ *G02B 6/3636* (2013.01); *G02B 6/3632* (2013.01); *G02B 6/3628* (2013.01); *G02B 6/3652* (2013.01); *G02B 6/3616* (2013.01); *G02B 6/4452* (2013.01)
USPC ............................. 385/136; 385/135; 385/137

(58) Field of Classification Search
CPC .. G02B 6/3616; G02B 6/3828; G02B 6/3636; G02B 6/364; G02B 6/3644; G02B 6/3652; G02B 6/4452
USPC ................................................. 385/135–137
See application file for complete search history.

(56) References Cited

U.S. PATENT DOCUMENTS

| | | | |
|---|---|---|---|
| 620,013 A | 2/1899 | Barnes | |
| 2,614,685 A | 10/1952 | Miller | |
| 3,175,873 A | 3/1965 | Blomquist et al. | |
| 3,212,192 A | 10/1965 | Bachmann et al. | |

(Continued)

FOREIGN PATENT DOCUMENTS

| | | |
|---|---|---|
| CA | 2029592 A1 | 5/1992 |
| CA | 2186314 A1 | 4/1997 |

(Continued)

OTHER PUBLICATIONS

Annex to Form PCT/ISA/2006, Communication Relating to the Results of the Partial International Search, for PCT/US2009/004549 mailed Feb. 10, 2010, 2 pages.

(Continued)

*Primary Examiner* — Rhonda Peace

(57) ABSTRACT

Methods and apparatuses for providing secure fiber optic connections are disclosed. In one embodiment, a locking apparatus comprising a locking plate to secure fiber optic connections is disclosed. The locking plate is configured to be attached to a fiber optic adapter panel and adjustably positioned to a selected position such that when a fiber optic connector on the end of a fiber optic cable is connected to a fiber optic adapter on the fiber optic adapter panel, the fiber optic cable is allowed to pass through a cut-out area of the locking plate but a finger portion of the locking plate does not allow the fiber optic connector to pass through the cut-out area. A lock disposed on the locking plate is configured to keep the locking plate in the selected position. The locking apparatus may also be used to securely store unused or unconnected ports of an optical splitter in a separate enclosure, such as a parking lot compartment.

19 Claims, 14 Drawing Sheets

(56) References Cited

U.S. PATENT DOCUMENTS

| | | |
|---|---|---|
| 3,433,886 A | 3/1969 | Myers |
| 3,568,263 A | 3/1971 | Meehan |
| 3,646,244 A | 2/1972 | Cole |
| 3,880,396 A | 4/1975 | Freiberger et al. |
| 3,906,592 A | 9/1975 | Sakasegawa et al. |
| 3,991,960 A | 11/1976 | Tanaka |
| 4,047,797 A | 9/1977 | Arnold et al. |
| 4,059,872 A | 11/1977 | Delesandri |
| 4,119,285 A | 10/1978 | Bisping et al. |
| 4,239,316 A | 12/1980 | Spaulding |
| 4,285,486 A | 8/1981 | Von Osten et al. |
| 4,354,731 A | 10/1982 | Mouissie |
| 4,457,482 A | 7/1984 | Kitagawa |
| 4,525,012 A | 6/1985 | Dunner |
| 4,540,222 A | 9/1985 | Burrell |
| 4,564,163 A | 1/1986 | Barnett |
| 4,597,173 A | 7/1986 | Chino et al. |
| 4,611,875 A | 9/1986 | Clarke et al. |
| 4,635,886 A | 1/1987 | Santucci et al. |
| 4,645,292 A | 2/1987 | Sammueller |
| 4,657,340 A | 4/1987 | Tanaka et al. |
| 4,681,288 A | 7/1987 | Nakamura |
| 4,702,551 A | 10/1987 | Coulombe |
| 4,736,100 A | 4/1988 | Vastagh |
| 4,744,629 A | 5/1988 | Bertoglio et al. |
| 4,747,020 A | 5/1988 | Brickley et al. |
| 4,752,110 A | 6/1988 | Blanchet et al. |
| 4,787,706 A | 11/1988 | Cannon, Jr. et al. |
| 4,792,203 A | 12/1988 | Nelson et al. |
| 4,798,432 A | 1/1989 | Becker et al. |
| 4,808,774 A | 2/1989 | Crane |
| 4,824,193 A | 4/1989 | Maeda et al. |
| 4,824,196 A | 4/1989 | Bylander |
| 4,826,277 A | 5/1989 | Weber et al. |
| 4,838,643 A | 6/1989 | Hodges et al. |
| 4,865,280 A | 9/1989 | Wollar |
| 4,898,448 A | 2/1990 | Cooper |
| 4,900,123 A | 2/1990 | Barlow |
| 4,911,662 A | 3/1990 | Debortoli et al. |
| 4,948,220 A | 8/1990 | Violo et al. |
| 4,949,376 A | 8/1990 | Nieves et al. |
| 4,971,421 A | 11/1990 | Ori |
| 4,991,928 A | 2/1991 | Zimmer |
| 4,995,688 A | 2/1991 | Anton et al. |
| 5,001,602 A | 3/1991 | Suffi et al. |
| 5,005,941 A | 4/1991 | Barlow et al. |
| 5,017,211 A | 5/1991 | Wenger et al. |
| 5,023,646 A | 6/1991 | Ishida et al. |
| 5,024,498 A | 6/1991 | Becker et al. |
| 5,028,114 A | 7/1991 | Krausse et al. |
| 5,037,175 A | 8/1991 | Weber |
| 5,048,918 A | 9/1991 | Daems et al. |
| 5,066,149 A | 11/1991 | Wheeler et al. |
| 5,067,784 A | 11/1991 | Debortoli et al. |
| 5,071,211 A | 12/1991 | Debortoli et al. |
| 5,071,220 A | 12/1991 | Ruello et al. |
| 5,073,042 A | 12/1991 | Mulholland et al. |
| 5,074,635 A | 12/1991 | Justice et al. |
| 5,076,688 A | 12/1991 | Bowen et al. |
| 5,080,459 A | 1/1992 | Wettengel et al. |
| 5,100,221 A | 3/1992 | Carney et al. |
| 5,104,336 A | 4/1992 | Hatanaka et al. |
| 5,125,060 A | 6/1992 | Edmundson |
| 5,127,082 A | 6/1992 | Below et al. |
| 5,127,851 A | 7/1992 | Hilbert et al. |
| 5,129,030 A | 7/1992 | Petrunia |
| 5,129,607 A | 7/1992 | Satoh |
| 5,133,039 A | 7/1992 | Dixit |
| 5,138,678 A | 8/1992 | Briggs et al. |
| 5,138,688 A | 8/1992 | Debortoli |
| 5,142,598 A | 8/1992 | Tabone |
| 5,142,607 A | 8/1992 | Petrotta et al. |
| 5,150,277 A | 9/1992 | Bainbridge et al. |
| D330,368 S | 10/1992 | Bourgeois et al. |
| 5,152,760 A | 10/1992 | Latina |
| 5,153,910 A | 10/1992 | Mickelson et al. |
| 5,157,749 A | 10/1992 | Briggs et al. |
| 5,167,001 A | 11/1992 | Debortoli et al. |
| 5,170,452 A | 12/1992 | Ott |
| 5,189,723 A | 2/1993 | Johnson et al. |
| 5,204,929 A | 4/1993 | Machall et al. |
| 5,209,572 A | 5/1993 | Jordan |
| 5,214,735 A | 5/1993 | Henneberger et al. |
| 5,224,186 A | 6/1993 | Kishimoto et al. |
| 5,231,687 A | 7/1993 | Handley |
| 5,231,688 A | 7/1993 | Zimmer |
| 5,233,674 A | 8/1993 | Vladic |
| 5,239,609 A | 8/1993 | Auteri |
| 5,243,679 A | 9/1993 | Sharrow et al. |
| 5,253,320 A | 10/1993 | Takahashi et al. |
| 5,260,957 A | 11/1993 | Hakimi et al. |
| 5,261,633 A | 11/1993 | Mastro |
| 5,265,187 A | 11/1993 | Morin et al. |
| 5,274,731 A | 12/1993 | White |
| 5,280,138 A | 1/1994 | Preston et al. |
| 5,285,515 A | 2/1994 | Milanowski et al. |
| 5,315,679 A | 5/1994 | Baldwin et al. |
| 5,317,663 A | 5/1994 | Beard et al. |
| 5,323,478 A | 6/1994 | Milanowski et al. |
| 5,323,480 A | 6/1994 | Mullaney et al. |
| 5,333,193 A | 7/1994 | Cote et al. |
| 5,333,221 A | 7/1994 | Briggs et al. |
| 5,333,222 A | 7/1994 | Belenkiy et al. |
| 5,337,400 A | 8/1994 | Morin et al. |
| 5,339,379 A | 8/1994 | Kutsch et al. |
| 5,347,603 A | 9/1994 | Belenkiy et al. |
| 5,353,367 A | 10/1994 | Czosnowski et al. |
| 5,359,688 A | 10/1994 | Underwood |
| 5,363,466 A | 11/1994 | Milanowski et al. |
| 5,363,467 A | 11/1994 | Keith |
| 5,366,388 A | 11/1994 | Freeman et al. |
| 5,367,598 A | 11/1994 | Devenish, III et al. |
| 5,373,421 A | 12/1994 | Detsikas et al. |
| 5,383,051 A | 1/1995 | Delrosso et al. |
| 5,390,272 A | 2/1995 | Repta et al. |
| 5,398,295 A | 3/1995 | Chang et al. |
| 5,398,820 A | 3/1995 | Kiss |
| 5,399,814 A | 3/1995 | Staber et al. |
| 5,401,193 A | 3/1995 | Lo Cicero et al. |
| 5,402,515 A | 3/1995 | Vidacovich et al. |
| 5,408,557 A | 4/1995 | Hsu |
| RE34,955 E | 5/1995 | Anton et al. |
| 5,412,751 A | 5/1995 | Siemon et al. |
| 5,416,837 A | 5/1995 | Cote et al. |
| 5,418,874 A | 5/1995 | Carlisle et al. |
| 5,420,956 A | 5/1995 | Grugel et al. |
| 5,420,958 A | 5/1995 | Henson et al. |
| 5,438,641 A | 8/1995 | Malacarne |
| 5,442,725 A | 8/1995 | Peng |
| 5,442,726 A | 8/1995 | Howard et al. |
| 5,443,232 A | 8/1995 | Kesinger et al. |
| 5,444,804 A | 8/1995 | Yui et al. |
| 5,448,015 A | 9/1995 | Jamet et al. |
| 5,450,518 A | 9/1995 | Burek et al. |
| 5,458,019 A | 10/1995 | Trevino |
| 5,471,555 A | 11/1995 | Braga et al. |
| 5,479,505 A | 12/1995 | Butler et al. |
| 5,481,634 A | 1/1996 | Anderson et al. |
| 5,481,939 A | 1/1996 | Bernardini |
| 5,490,229 A | 2/1996 | Ghandeharizadeh et al. |
| 5,497,416 A | 3/1996 | Butler, III et al. |
| 5,497,444 A | 3/1996 | Wheeler |
| 5,511,144 A | 4/1996 | Hawkins et al. |
| 5,511,798 A * | 4/1996 | Kawamoto et al. ........... 277/647 |
| 5,519,804 A | 5/1996 | Burek et al. |
| 5,535,970 A | 7/1996 | Gobbi |
| 5,542,015 A | 7/1996 | Hultermans |
| 5,546,495 A | 8/1996 | Bruckner et al. |
| 5,548,641 A | 8/1996 | Butler et al. |
| 5,553,183 A | 9/1996 | Bechamps |
| 5,553,186 A | 9/1996 | Allen |
| 5,572,617 A | 11/1996 | Bernhardt et al. |
| 5,575,680 A | 11/1996 | Suffi |
| 5,577,151 A | 11/1996 | Hoffer |

(56) References Cited

U.S. PATENT DOCUMENTS

| | | | |
|---|---|---|---|
| 5,590,234 A | 12/1996 | Pulido | |
| 5,595,507 A | 1/1997 | Braun et al. | |
| 5,596,670 A | 1/1997 | Debortoli et al. | |
| 5,600,020 A | 2/1997 | Wehle et al. | |
| 5,602,954 A | 2/1997 | Nolf et al. | |
| 5,608,606 A | 3/1997 | Blaney | |
| 5,613,030 A | 3/1997 | Hoffer et al. | |
| 5,617,501 A | 4/1997 | Miller et al. | |
| 5,638,474 A | 6/1997 | Lampert et al. | |
| 5,640,476 A | 6/1997 | Womack et al. | |
| 5,640,482 A | 6/1997 | Barry et al. | |
| 5,647,043 A | 7/1997 | Anderson et al. | |
| 5,647,045 A | 7/1997 | Robinson et al. | |
| 5,650,334 A | 7/1997 | Zuk et al. | |
| 5,668,911 A | 9/1997 | Debortoli | |
| 5,671,273 A | 9/1997 | Lanquist | |
| 5,689,605 A | 11/1997 | Cobb et al. | |
| 5,689,607 A | 11/1997 | Vincent et al. | |
| 5,694,511 A | 12/1997 | Pimpinella et al. | |
| 5,701,380 A | 12/1997 | Larson et al. | |
| 5,704,573 A | 1/1998 | de Beers et al. | |
| 5,708,742 A | 1/1998 | Beun et al. | |
| 5,708,751 A | 1/1998 | Mattei | |
| 5,710,851 A | 1/1998 | Walter et al. | |
| 5,717,810 A | 2/1998 | Wheeler | |
| 5,734,776 A | 3/1998 | Puetz | |
| 5,740,300 A | 4/1998 | Hodge | |
| 5,742,982 A | 4/1998 | Dodd et al. | |
| 5,751,874 A | 5/1998 | Chudoba et al. | |
| 5,751,882 A | 5/1998 | Daems et al. | |
| 5,758,003 A | 5/1998 | Wheeler et al. | |
| 5,758,004 A | 5/1998 | Alarcon et al. | |
| 5,761,026 A | 6/1998 | Robinson et al. | |
| 5,769,908 A | 6/1998 | Koppelman | |
| 5,774,612 A | 6/1998 | Belenkiy et al. | |
| 5,778,122 A | 7/1998 | Giebel et al. | |
| 5,778,130 A | 7/1998 | Walters et al. | |
| 5,781,686 A | 7/1998 | Robinson et al. | |
| 5,790,741 A | 8/1998 | Vincent et al. | |
| 5,793,920 A | 8/1998 | Wilkins et al. | |
| 5,793,921 A | 8/1998 | Wilkins et al. | |
| 5,796,908 A | 8/1998 | Vicory | |
| 5,823,646 A | 10/1998 | Arizpe et al. | |
| 5,825,955 A | 10/1998 | Ernst et al. | |
| 5,825,961 A | 10/1998 | Wilkins et al. | |
| 5,828,807 A * | 10/1998 | Tucker et al. | 385/135 |
| 5,832,162 A | 11/1998 | Sarbell | |
| 5,835,657 A | 11/1998 | Suarez et al. | |
| 5,835,658 A | 11/1998 | Smith | |
| 5,862,290 A | 1/1999 | Burek et al. | |
| 5,870,519 A | 2/1999 | Jenkins et al. | |
| 5,874,733 A | 2/1999 | Silver et al. | |
| 5,877,565 A | 3/1999 | Hollenbach et al. | |
| 5,880,864 A | 3/1999 | Williams et al. | |
| 5,881,200 A | 3/1999 | Burt | |
| 5,883,995 A | 3/1999 | Lu et al. | |
| 5,884,003 A | 3/1999 | Cloud et al. | |
| 5,887,095 A | 3/1999 | Nagase et al. | |
| 5,887,106 A | 3/1999 | Cheeseman et al. | |
| 5,892,877 A | 4/1999 | Meyerhoefer | |
| 5,894,540 A | 4/1999 | Drewing | |
| 5,901,220 A | 5/1999 | Garver et al. | |
| 5,903,693 A | 5/1999 | Brown | |
| 5,906,342 A | 5/1999 | Kraus | |
| 5,909,298 A | 6/1999 | Shimada et al. | |
| 5,913,006 A | 6/1999 | Summach | |
| 5,914,976 A | 6/1999 | Jayaraman et al. | |
| 5,915,055 A | 6/1999 | Bennett et al. | |
| 5,923,804 A | 7/1999 | Rosson | |
| 5,930,425 A | 7/1999 | Abel et al. | |
| 5,933,557 A | 8/1999 | Ott | |
| 5,943,460 A | 8/1999 | Mead et al. | |
| 5,945,633 A | 8/1999 | Ott et al. | |
| 5,946,440 A | 8/1999 | Puetz | |
| 5,949,946 A | 9/1999 | Debortoli et al. | |
| 5,953,962 A | 9/1999 | Hewson | |
| 5,956,439 A | 9/1999 | Pimpinella | |
| 5,956,444 A | 9/1999 | Duda et al. | |
| 5,956,449 A | 9/1999 | Otani et al. | |
| 5,966,492 A | 10/1999 | Bechamps et al. | |
| 5,969,294 A | 10/1999 | Eberle et al. | |
| 5,975,769 A | 11/1999 | Larson et al. | |
| 5,978,540 A | 11/1999 | Bechamps et al. | |
| 5,980,303 A | 11/1999 | Lee et al. | |
| 5,993,071 A | 11/1999 | Hultermans | |
| 5,995,700 A | 11/1999 | Burek et al. | |
| 5,999,393 A | 12/1999 | Brower | |
| 6,001,831 A | 12/1999 | Papenfuhs et al. | |
| 6,009,224 A | 12/1999 | Allen | |
| 6,009,225 A | 12/1999 | Ray et al. | |
| 6,011,831 A | 1/2000 | Nieves et al. | |
| 6,027,252 A | 2/2000 | Erdman et al. | |
| 6,044,193 A | 3/2000 | Szentesi et al. | |
| 6,058,235 A | 5/2000 | Hiramatsu et al. | |
| 6,061,492 A | 5/2000 | Strause et al. | |
| 6,078,661 A | 6/2000 | Arnett et al. | |
| 6,079,881 A | 6/2000 | Roth | |
| 6,127,627 A | 10/2000 | Daoud | |
| 6,130,983 A | 10/2000 | Cheng | |
| 6,134,370 A | 10/2000 | Childers et al. | |
| 6,149,313 A | 11/2000 | Giebel et al. | |
| 6,149,315 A | 11/2000 | Stephenson | |
| 6,151,432 A | 11/2000 | Nakajima et al. | |
| 6,160,946 A | 12/2000 | Thompson et al. | |
| 6,170,784 B1 | 1/2001 | MacDonald et al. | |
| 6,181,861 B1 | 1/2001 | Wenski et al. | |
| 6,188,687 B1 | 2/2001 | Mussman et al. | |
| 6,188,825 B1 | 2/2001 | Bandy et al. | |
| 6,192,180 B1 | 2/2001 | Kim et al. | |
| 6,201,920 B1 | 3/2001 | Noble et al. | |
| 6,208,796 B1 | 3/2001 | Williams Vigliaturo | |
| 6,212,324 B1 | 4/2001 | Lin et al. | |
| 6,215,938 B1 | 4/2001 | Reitmeier et al. | |
| 6,216,987 B1 | 4/2001 | Fukuo | |
| 6,227,717 B1 | 5/2001 | Ott et al. | |
| 6,234,683 B1 | 5/2001 | Waldron et al. | |
| 6,234,685 B1 | 5/2001 | Carlisle et al. | |
| 6,236,795 B1 | 5/2001 | Rodgers | |
| 6,240,229 B1 | 5/2001 | Roth | |
| 6,243,522 B1 | 6/2001 | Allan et al. | |
| 6,245,998 B1 | 6/2001 | Curry et al. | |
| 6,263,141 B1 | 7/2001 | Smith | |
| 6,265,680 B1 | 7/2001 | Robertson | |
| 6,269,212 B1 | 7/2001 | Schiattone | |
| 6,275,641 B1 | 8/2001 | Daoud | |
| 6,278,829 B1 | 8/2001 | BuAbbud et al. | |
| 6,278,831 B1 | 8/2001 | Henderson et al. | |
| D448,005 S | 9/2001 | Klein, Jr. et al. | |
| 6,292,614 B1 | 9/2001 | Smith et al. | |
| 6,301,424 B1 | 10/2001 | Hwang | |
| 6,307,997 B1 | 10/2001 | Walters et al. | |
| 6,318,824 B1 | 11/2001 | LaGrotta et al. | |
| 6,321,017 B1 | 11/2001 | Janus et al. | |
| 6,322,279 B1 | 11/2001 | Yamamoto et al. | |
| 6,325,549 B1 | 12/2001 | Shevchuk | |
| RE37,489 E | 1/2002 | Anton et al. | |
| 6,343,313 B1 | 1/2002 | Salesky et al. | |
| 6,347,888 B1 | 2/2002 | Puetz | |
| 6,353,696 B1 | 3/2002 | Gordon et al. | |
| 6,353,697 B1 | 3/2002 | Daoud | |
| 6,359,228 B1 | 3/2002 | Strause et al. | |
| 6,363,200 B1 | 3/2002 | Thompson et al. | |
| 6,370,309 B1 | 4/2002 | Daoud | |
| 6,371,419 B1 | 4/2002 | Ohnuki | |
| 6,375,129 B2 | 4/2002 | Koziol | |
| 6,377,218 B1 | 4/2002 | Nelson et al. | |
| 6,379,052 B1 | 4/2002 | de Jong et al. | |
| 6,385,374 B2 | 5/2002 | Kropp | |
| 6,385,381 B1 | 5/2002 | Janus et al. | |
| 6,389,214 B1 | 5/2002 | Smith et al. | |
| 6,397,166 B1 | 5/2002 | Leung et al. | |
| 6,398,149 B1 | 6/2002 | Hines et al. | |
| 6,411,767 B1 | 6/2002 | Burrous et al. | |
| 6,418,262 B1 | 7/2002 | Puetz et al. | |

(56) References Cited

U.S. PATENT DOCUMENTS

| | | | |
|---|---|---|---|
| 6,424,781 B1 | 7/2002 | Puetz et al. |
| 6,425,694 B1 | 7/2002 | Szilagyi et al. |
| 6,427,045 B1 | 7/2002 | Matthes et al. |
| 6,431,762 B1 | 8/2002 | Taira et al. |
| 6,434,313 B1 | 8/2002 | Clapp, Jr. et al. |
| 6,438,310 B1 | 8/2002 | Lance et al. |
| 6,452,925 B1 | 9/2002 | Sistanizadeh et al. |
| 6,456,773 B1 | 9/2002 | Keys |
| 6,464,402 B1 | 10/2002 | Andrews et al. |
| 6,466,724 B1 | 10/2002 | Glover et al. |
| 6,469,905 B1 | 10/2002 | Hwang |
| D466,087 S | 11/2002 | Cuny et al. |
| 6,478,472 B1 | 11/2002 | Anderson et al. |
| 6,480,487 B1 | 11/2002 | Wegleitner et al. |
| 6,480,660 B1 | 11/2002 | Reitmeier et al. |
| 6,483,977 B2 | 11/2002 | Battey et al. |
| 6,484,958 B1 | 11/2002 | Xue et al. |
| 6,496,640 B1 | 12/2002 | Harvey et al. |
| 6,504,988 B1 | 1/2003 | Trebesch et al. |
| 6,507,980 B2 | 1/2003 | Bremicker |
| 6,510,274 B1 | 1/2003 | Wu et al. |
| 6,532,332 B2 | 3/2003 | Solheid et al. |
| 6,533,472 B1 | 3/2003 | Dinh et al. |
| 6,535,397 B2 | 3/2003 | Clark et al. |
| 6,539,147 B1 | 3/2003 | Mahony |
| 6,539,160 B2 | 3/2003 | Battey et al. |
| 6,542,688 B1 | 4/2003 | Battey et al. |
| 6,550,977 B2 | 4/2003 | Hizuka |
| 6,554,485 B1 | 4/2003 | Beatty et al. |
| 6,560,334 B1 | 5/2003 | Mullaney et al. |
| 6,567,601 B2 | 5/2003 | Daoud et al. |
| 6,571,048 B1 | 5/2003 | Bechamps et al. |
| 6,577,595 B1 | 6/2003 | Counterman |
| 6,577,801 B2 | 6/2003 | Broderick et al. |
| 6,579,014 B2 | 6/2003 | Melton et al. |
| 6,584,267 B1 | 6/2003 | Caveney et al. |
| 6,587,630 B2 * | 7/2003 | Spence et al. ............... 385/134 |
| 6,588,938 B1 | 7/2003 | Lampert et al. |
| 6,591,051 B2 | 7/2003 | Solheid et al. |
| 6,592,266 B1 | 7/2003 | Hankins et al. |
| 6,597,670 B1 | 7/2003 | Tweedy et al. |
| 6,600,866 B2 | 7/2003 | Gatica et al. |
| 6,601,997 B2 | 8/2003 | Ngo |
| 6,612,515 B1 | 9/2003 | Tinucci et al. |
| 6,614,978 B1 | 9/2003 | Caveney |
| 6,614,980 B1 | 9/2003 | Mahony |
| 6,621,975 B2 | 9/2003 | Laporte et al. |
| 6,625,374 B2 | 9/2003 | Holman et al. |
| 6,625,375 B1 | 9/2003 | Mahony |
| 6,631,237 B2 | 10/2003 | Knudsen et al. |
| 6,640,042 B2 | 10/2003 | Araki et al. |
| RE38,311 E | 11/2003 | Wheeler |
| 6,644,863 B1 | 11/2003 | Azami et al. |
| 6,647,197 B1 | 11/2003 | Marrs et al. |
| 6,648,520 B2 | 11/2003 | McDonald et al. |
| 6,654,536 B2 | 11/2003 | Battey et al. |
| 6,668,127 B1 | 12/2003 | Mahony |
| 6,669,149 B2 | 12/2003 | Akizuki |
| 6,677,520 B1 | 1/2004 | Kim et al. |
| 6,679,604 B1 | 1/2004 | Bove et al. |
| 6,687,450 B1 | 2/2004 | Kempeneers et al. |
| 6,701,056 B2 | 3/2004 | Burek et al. |
| 6,710,366 B1 | 3/2004 | Lee et al. |
| 6,715,619 B2 | 4/2004 | Kim et al. |
| 6,719,149 B2 | 4/2004 | Tomino |
| 6,741,784 B1 | 5/2004 | Guan |
| 6,741,785 B2 | 5/2004 | Barthel et al. |
| 6,746,037 B1 | 6/2004 | Kaplenski et al. |
| 6,748,154 B2 | 6/2004 | O'Leary et al. |
| 6,748,155 B2 | 6/2004 | Kim et al. |
| 6,758,600 B2 | 7/2004 | Del Grosso et al. |
| 6,768,860 B2 | 7/2004 | Liberty |
| 6,771,861 B2 | 8/2004 | Wagner et al. |
| 6,773,297 B2 | 8/2004 | Komiya |
| 6,778,525 B1 | 8/2004 | Baum et al. |
| 6,778,752 B2 | 8/2004 | Laporte et al. |
| 6,786,647 B1 | 9/2004 | Hinds et al. |
| 6,788,871 B2 | 9/2004 | Taylor |
| 6,792,190 B2 | 9/2004 | Xin et al. |
| 6,798,751 B1 | 9/2004 | Voit et al. |
| 6,804,447 B2 | 10/2004 | Smith et al. |
| 6,810,194 B2 | 10/2004 | Griffiths et al. |
| 6,813,412 B2 | 11/2004 | Lin |
| 6,816,660 B2 | 11/2004 | Nashimoto |
| 6,818,834 B1 | 11/2004 | Lin |
| 6,819,856 B2 | 11/2004 | Dagley et al. |
| 6,819,857 B2 | 11/2004 | Douglas et al. |
| 6,826,174 B1 | 11/2004 | Erekson et al. |
| 6,826,346 B2 | 11/2004 | Sloan et al. |
| 6,839,428 B2 | 1/2005 | Brower et al. |
| 6,839,438 B1 | 1/2005 | Riegelsberger et al. |
| 6,840,815 B2 | 1/2005 | Musolf et al. |
| 6,845,207 B2 | 1/2005 | Schray |
| 6,848,862 B1 | 2/2005 | Schlig |
| 6,850,685 B2 | 2/2005 | Tinucci et al. |
| 6,853,637 B1 | 2/2005 | Norrell et al. |
| 6,854,894 B1 | 2/2005 | Yunker et al. |
| 6,856,334 B1 | 2/2005 | Fukui |
| 6,865,331 B2 | 3/2005 | Mertesdorf |
| 6,865,334 B2 | 3/2005 | Cooke et al. |
| 6,866,541 B2 | 3/2005 | Barker et al. |
| 6,868,216 B1 | 3/2005 | Gehrke |
| 6,869,227 B2 | 3/2005 | Del Grosso et al. |
| 6,870,734 B2 | 3/2005 | Mertesdorf et al. |
| 6,870,997 B2 | 3/2005 | Cooke |
| 6,879,545 B2 | 4/2005 | Cooke et al. |
| 6,915,058 B2 | 7/2005 | Pons |
| 6,920,273 B2 | 7/2005 | Knudsen |
| 6,920,274 B2 | 7/2005 | Rapp et al. |
| 6,923,406 B2 | 8/2005 | Akizuki |
| 6,925,241 B2 | 8/2005 | Bohle et al. |
| 6,934,451 B2 | 8/2005 | Cooke |
| 6,934,456 B2 | 8/2005 | Ferris et al. |
| 6,935,598 B2 | 8/2005 | Sono et al. |
| 6,937,807 B2 | 8/2005 | Franklin et al. |
| 6,944,383 B1 | 9/2005 | Herzog et al. |
| 6,944,389 B2 | 9/2005 | Giraud et al. |
| 6,952,530 B2 | 10/2005 | Helvajian et al. |
| 6,963,690 B1 | 11/2005 | Kassal et al. |
| 6,968,107 B2 | 11/2005 | Belardi et al. |
| 6,968,111 B2 | 11/2005 | Trebesch et al. |
| 6,985,665 B2 | 1/2006 | Baechtle |
| 6,993,237 B2 | 1/2006 | Cooke et al. |
| 7,000,784 B2 | 2/2006 | Canty et al. |
| 7,005,582 B2 | 2/2006 | Muller et al. |
| 7,006,748 B2 | 2/2006 | Dagley et al. |
| 7,007,296 B2 | 2/2006 | Rakib |
| 7,027,695 B2 | 4/2006 | Cooke et al. |
| 7,027,706 B2 | 4/2006 | Diaz et al. |
| 7,031,588 B2 | 4/2006 | Cowley et al. |
| 7,035,510 B2 | 4/2006 | Zimmel et al. |
| 7,038,137 B2 | 5/2006 | Grubish et al. |
| 7,054,513 B2 | 5/2006 | Herz et al. |
| 7,066,748 B2 | 6/2006 | Bricaud et al. |
| 7,068,907 B2 | 6/2006 | Schray |
| 7,070,459 B2 | 7/2006 | Denovich et al. |
| 7,079,744 B2 | 7/2006 | Douglas et al. |
| 7,090,406 B2 | 8/2006 | Melton et al. |
| 7,090,407 B2 | 8/2006 | Melton et al. |
| 7,094,095 B1 | 8/2006 | Caveney |
| 7,097,047 B2 | 8/2006 | Lee et al. |
| 7,101,093 B2 | 9/2006 | Hsiao et al. |
| 7,102,884 B2 | 9/2006 | Mertesdorf et al. |
| 7,103,255 B2 | 9/2006 | Reagan et al. |
| 7,110,654 B2 | 9/2006 | Dillat |
| 7,111,990 B2 | 9/2006 | Melton et al. |
| 7,113,679 B2 | 9/2006 | Melton et al. |
| 7,113,686 B2 | 9/2006 | Bellekens et al. |
| 7,113,687 B2 | 9/2006 | Womack et al. |
| 7,116,491 B1 | 10/2006 | Willey et al. |
| 7,116,883 B2 | 10/2006 | Kline et al. |
| 7,118,281 B2 | 10/2006 | Chiu et al. |
| 7,118,405 B2 | 10/2006 | Peng |
| 7,120,347 B2 | 10/2006 | Blackwell, Jr. et al. |

(56) References Cited

U.S. PATENT DOCUMENTS

| | | | |
|---|---|---|---|
| 7,120,348 B2 | 10/2006 | Trebesch et al. |
| 7,120,349 B2 | 10/2006 | Elliott |
| 7,128,471 B2 | 10/2006 | Wilson |
| 7,139,462 B1 * | 11/2006 | Richtman ............... 385/137 |
| 7,140,903 B2 | 11/2006 | Pulizzi et al. |
| 7,171,099 B2 | 1/2007 | Barnes et al. |
| 7,171,121 B1 | 1/2007 | Skarica et al. |
| 7,181,142 B1 | 2/2007 | Xu et al. |
| 7,193,783 B2 | 3/2007 | Willey et al. |
| 7,194,181 B2 | 3/2007 | Holmberg et al. |
| 7,195,521 B2 | 3/2007 | Musolf et al. |
| 7,200,314 B2 | 4/2007 | Womack et al. |
| 7,200,316 B2 | 4/2007 | Giraud et al. |
| 7,220,065 B2 | 5/2007 | Han et al. |
| 7,221,832 B2 | 5/2007 | Tinucci |
| 7,228,036 B2 | 6/2007 | Elkins, II et al. |
| 7,231,125 B2 | 6/2007 | Douglas et al. |
| 7,234,878 B2 | 6/2007 | Yamauchi et al. |
| 7,236,677 B2 | 6/2007 | Escoto et al. |
| 7,239,789 B2 | 7/2007 | Grubish et al. |
| 7,245,809 B1 | 7/2007 | Gniadek et al. |
| 7,259,325 B2 | 8/2007 | Pincu et al. |
| 7,266,283 B2 | 9/2007 | Kline et al. |
| 7,270,485 B1 | 9/2007 | Robinson et al. |
| 7,272,291 B2 | 9/2007 | Bayazit et al. |
| 7,274,852 B1 | 9/2007 | Smrha et al. |
| 7,287,913 B2 | 10/2007 | Keenum et al. |
| 7,289,731 B2 | 10/2007 | Thinguldstad |
| 7,292,769 B2 | 11/2007 | Watanabe et al. |
| 7,298,950 B2 | 11/2007 | Frohlich |
| 7,300,216 B2 | 11/2007 | Morse et al. |
| 7,300,308 B2 | 11/2007 | Laursen et al. |
| 7,302,149 B2 | 11/2007 | Swam et al. |
| 7,302,153 B2 | 11/2007 | Thom |
| 7,302,154 B2 | 11/2007 | Trebesch et al. |
| 7,308,184 B2 | 12/2007 | Barnes et al. |
| 7,310,471 B2 | 12/2007 | Bayazit et al. |
| 7,310,472 B2 | 12/2007 | Haberman |
| 7,315,681 B2 | 1/2008 | Kewitsch |
| 7,325,975 B2 | 2/2008 | Yamada et al. |
| 7,330,625 B2 | 2/2008 | Barth |
| 7,330,626 B2 | 2/2008 | Kowalczyk et al. |
| 7,330,629 B2 | 2/2008 | Cooke et al. |
| 7,331,718 B2 | 2/2008 | Yazaki et al. |
| 7,340,145 B2 | 3/2008 | Allen |
| 7,349,615 B2 | 3/2008 | Frazier et al. |
| 7,373,071 B2 | 5/2008 | Douglas et al. |
| 7,376,321 B2 | 5/2008 | Bolster et al. |
| 7,376,323 B2 | 5/2008 | Zimmel |
| 7,391,952 B1 | 6/2008 | Ugolini et al. |
| 7,397,996 B2 | 7/2008 | Herzog et al. |
| 7,400,813 B2 | 7/2008 | Zimmel |
| 7,404,736 B2 | 7/2008 | Herbst et al. |
| 7,409,137 B2 | 8/2008 | Barnes |
| 7,414,198 B2 | 8/2008 | Stansbie et al. |
| 7,417,188 B2 | 8/2008 | McNutt et al. |
| 7,418,182 B2 | 8/2008 | Krampotich |
| 7,418,184 B1 | 8/2008 | Gonzales et al. |
| 7,421,182 B2 | 9/2008 | Bayazit et al. |
| 7,428,363 B2 | 9/2008 | Leon et al. |
| 7,437,049 B2 | 10/2008 | Krampotich |
| 7,439,453 B2 | 10/2008 | Murano et al. |
| 7,454,113 B2 | 11/2008 | Barnes |
| 7,460,757 B2 | 12/2008 | Hoehne et al. |
| 7,460,758 B2 | 12/2008 | Xin |
| 7,461,981 B2 | 12/2008 | Yow, Jr. et al. |
| 7,462,779 B2 | 12/2008 | Caveney et al. |
| 7,463,810 B2 | 12/2008 | Bayazit et al. |
| 7,463,811 B2 | 12/2008 | Trebesch et al. |
| 7,469,090 B2 | 12/2008 | Ferris et al. |
| 7,471,867 B2 | 12/2008 | Vogel et al. |
| 7,474,828 B2 | 1/2009 | Leon et al. |
| 7,477,824 B2 | 1/2009 | Reagan et al. |
| 7,477,826 B2 | 1/2009 | Mullaney et al. |
| 7,480,438 B2 | 1/2009 | Douglas et al. |
| 7,488,205 B2 | 2/2009 | Spisany et al. |
| 7,493,002 B2 | 2/2009 | Coburn et al. |
| 7,496,269 B1 | 2/2009 | Lee |
| 7,499,622 B2 | 3/2009 | Castonguay et al. |
| 7,499,623 B2 | 3/2009 | Barnes et al. |
| 7,507,111 B2 | 3/2009 | Togami et al. |
| 7,509,015 B2 | 3/2009 | Murano |
| 7,509,016 B2 | 3/2009 | Smith et al. |
| 7,522,804 B2 | 4/2009 | Araki et al. |
| 7,523,898 B1 | 4/2009 | Barry et al. |
| 7,526,171 B2 | 4/2009 | Caveney et al. |
| 7,526,172 B2 | 4/2009 | Gniadek et al. |
| 7,526,174 B2 | 4/2009 | Leon et al. |
| 7,529,458 B2 | 5/2009 | Spisany et al. |
| 7,534,958 B2 | 5/2009 | McNutt et al. |
| 7,536,075 B2 | 5/2009 | Zimmel |
| 7,542,645 B1 | 6/2009 | Hua et al. |
| 7,555,193 B2 | 6/2009 | Rapp et al. |
| 7,558,458 B2 | 7/2009 | Gronvall et al. |
| 7,565,051 B2 | 7/2009 | Vongseng |
| 7,567,744 B2 | 7/2009 | Krampotich et al. |
| 7,570,860 B2 | 8/2009 | Smrha et al. |
| 7,570,861 B2 | 8/2009 | Smrha et al. |
| 7,577,331 B2 | 8/2009 | Laurisch et al. |
| 7,603,020 B1 | 10/2009 | Wakileh et al. |
| 7,607,938 B2 | 10/2009 | Clark et al. |
| 7,609,967 B2 | 10/2009 | Hochbaum et al. |
| 7,613,377 B2 | 11/2009 | Gonzales et al. |
| 7,620,287 B2 | 11/2009 | Appenzeller et al. |
| 7,641,398 B2 | 1/2010 | O'Riorden et al. |
| 7,668,430 B2 | 2/2010 | McClellan et al. |
| 7,668,433 B2 | 2/2010 | Bayazit et al. |
| 7,672,561 B1 | 3/2010 | Keith et al. |
| 7,676,135 B2 | 3/2010 | Chen |
| 7,697,811 B2 | 4/2010 | Murano et al. |
| 7,715,125 B2 | 5/2010 | Willey |
| 7,715,683 B2 | 5/2010 | Kowalczyk et al. |
| 7,734,138 B2 | 6/2010 | Bloodworth et al. |
| 7,740,409 B2 | 6/2010 | Bolton et al. |
| 7,743,495 B2 | 6/2010 | Mori et al. |
| 7,751,674 B2 | 7/2010 | Hill |
| 7,751,675 B2 | 7/2010 | Holmberg et al. |
| 7,756,382 B2 | 7/2010 | Saravanos et al. |
| 7,760,984 B2 | 7/2010 | Solheid et al. |
| 7,764,858 B2 | 7/2010 | Bayazit et al. |
| 7,764,859 B2 | 7/2010 | Krampotich et al. |
| 7,805,044 B2 | 9/2010 | Reagan et al. |
| 7,809,235 B2 | 10/2010 | Reagan et al. |
| 7,822,310 B2 | 10/2010 | Castonguay et al. |
| 7,850,372 B2 | 12/2010 | Nishimura et al. |
| 7,853,112 B2 | 12/2010 | Zimmel et al. |
| 7,856,166 B2 | 12/2010 | Biribuze et al. |
| 7,914,332 B2 | 3/2011 | Song et al. |
| 7,942,589 B2 | 5/2011 | Yazaki et al. |
| 7,945,135 B2 | 5/2011 | Cooke et al. |
| 7,945,136 B2 | 5/2011 | Cooke et al. |
| 7,945,138 B2 | 5/2011 | Hill et al. |
| 7,962,000 B2 | 6/2011 | Wagner et al. |
| 7,970,250 B2 | 6/2011 | Morris |
| 8,014,171 B2 | 9/2011 | Kelly et al. |
| 8,014,646 B2 | 9/2011 | Keith et al. |
| 8,020,813 B1 | 9/2011 | Clark et al. |
| 8,059,932 B2 | 11/2011 | Hill et al. |
| 8,107,785 B2 | 1/2012 | Berglund et al. |
| 8,206,058 B2 | 6/2012 | Vrondran et al. |
| 8,472,773 B2 | 6/2013 | de Jong |
| 8,537,477 B2 | 9/2013 | Shioda |
| 2001/0010741 A1 | 8/2001 | Hizuka |
| 2001/0029125 A1 | 10/2001 | Morita et al. |
| 2002/0010818 A1 | 1/2002 | Wei et al. |
| 2002/0012353 A1 | 1/2002 | Gerszberg et al. |
| 2002/0034290 A1 | 3/2002 | Pershan |
| 2002/0037139 A1 | 3/2002 | Asao et al. |
| 2002/0064364 A1 | 5/2002 | Battey et al. |
| 2002/0131730 A1 | 9/2002 | Keeble et al. |
| 2002/0136519 A1 | 9/2002 | Tinucci et al. |
| 2002/0141724 A1 | 10/2002 | Ogawa et al. |
| 2002/0150372 A1 | 10/2002 | Schray |
| 2002/0172467 A1 | 11/2002 | Anderson et al. |

(56) References Cited

U.S. PATENT DOCUMENTS

| | | |
|---|---|---|
| 2002/0181918 A1* | 12/2002 | Spence et al. ............... 385/134 |
| 2002/0181922 A1 | 12/2002 | Xin et al. |
| 2002/0194596 A1 | 12/2002 | Srivastava |
| 2003/0007743 A1 | 1/2003 | Asada |
| 2003/0007767 A1 | 1/2003 | Douglas et al. |
| 2003/0021539 A1 | 1/2003 | Kwon et al. |
| 2003/0066998 A1 | 4/2003 | Lee |
| 2003/0086675 A1 | 5/2003 | Wu |
| 2003/0095753 A1 | 5/2003 | Wada et al. |
| 2003/0147604 A1 | 8/2003 | Tapia et al. |
| 2003/0174996 A1 | 9/2003 | Henschel et al. |
| 2003/0180012 A1 | 9/2003 | Deane et al. |
| 2003/0183413 A1 | 10/2003 | Kato |
| 2003/0199201 A1 | 10/2003 | Mullaney et al. |
| 2003/0210882 A1 | 11/2003 | Barthel et al. |
| 2003/0223723 A1 | 12/2003 | Massey et al. |
| 2003/0235387 A1 | 12/2003 | Dufour |
| 2004/0013389 A1 | 1/2004 | Taylor |
| 2004/0013390 A1 | 1/2004 | Kim et al. |
| 2004/0074852 A1 | 4/2004 | Knudsen et al. |
| 2004/0086238 A1 | 5/2004 | Finona et al. |
| 2004/0086252 A1 | 5/2004 | Smith et al. |
| 2004/0147159 A1 | 7/2004 | Urban et al. |
| 2004/0151465 A1 | 8/2004 | Krampotich et al. |
| 2004/0175090 A1 | 9/2004 | Vastmans et al. |
| 2004/0192115 A1 | 9/2004 | Bugg |
| 2004/0208459 A1 | 10/2004 | Mizue et al. |
| 2004/0228598 A1 | 11/2004 | Allen et al. |
| 2004/0240827 A1 | 12/2004 | Daoud et al. |
| 2004/0240882 A1 | 12/2004 | Lipski et al. |
| 2004/0264873 A1 | 12/2004 | Smith et al. |
| 2005/0002633 A1 | 1/2005 | Solheid et al. |
| 2005/0008131 A1 | 1/2005 | Cook |
| 2005/0026497 A1 | 2/2005 | Holliday |
| 2005/0036749 A1 | 2/2005 | Vogel et al. |
| 2005/0074990 A1 | 4/2005 | Shearman et al. |
| 2005/0076149 A1 | 4/2005 | McKown et al. |
| 2005/0083959 A1 | 4/2005 | Binder |
| 2005/0107086 A1 | 5/2005 | Tell et al. |
| 2005/0111809 A1 | 5/2005 | Giraud et al. |
| 2005/0111810 A1 | 5/2005 | Giraud et al. |
| 2005/0123261 A1 | 6/2005 | Bellekens et al. |
| 2005/0129379 A1 | 6/2005 | Reagan et al. |
| 2005/0175293 A1 | 8/2005 | Byers et al. |
| 2005/0201073 A1 | 9/2005 | Pincu et al. |
| 2005/0232566 A1 | 10/2005 | Rapp et al. |
| 2005/0233647 A1 | 10/2005 | Denovich et al. |
| 2005/0254757 A1 | 11/2005 | Ferretti, III et al. |
| 2005/0281526 A1 | 12/2005 | Vongseng et al. |
| 2006/0007562 A1 | 1/2006 | Willey et al. |
| 2006/0018448 A1 | 1/2006 | Stevens et al. |
| 2006/0018622 A1 | 1/2006 | Caveney |
| 2006/0039290 A1 | 2/2006 | Roden et al. |
| 2006/0044774 A1 | 3/2006 | Vasavda et al. |
| 2006/0072606 A1 | 4/2006 | Posthuma |
| 2006/0077968 A1 | 4/2006 | Pitsoulakis et al. |
| 2006/0093303 A1 | 5/2006 | Reagan et al. |
| 2006/0110118 A1 | 5/2006 | Escoto et al. |
| 2006/0147172 A1 | 7/2006 | Luther et al. |
| 2006/0153517 A1 | 7/2006 | Reagan et al. |
| 2006/0160377 A1 | 7/2006 | Huang |
| 2006/0165365 A1 | 7/2006 | Feustel et al. |
| 2006/0165366 A1 | 7/2006 | Feustel et al. |
| 2006/0191700 A1 | 8/2006 | Herzog et al. |
| 2006/0193590 A1 | 8/2006 | Puetz et al. |
| 2006/0193591 A1 | 8/2006 | Rapp et al. |
| 2006/0198098 A1 | 9/2006 | Clark et al. |
| 2006/0215980 A1 | 9/2006 | Bayazit et al. |
| 2006/0269194 A1 | 11/2006 | Luther et al. |
| 2006/0269206 A1 | 11/2006 | Zimmel |
| 2006/0269208 A1 | 11/2006 | Allen et al. |
| 2006/0275008 A1 | 12/2006 | Xin |
| 2006/0275009 A1 | 12/2006 | Ellison et al. |
| 2006/0285812 A1 | 12/2006 | Ferris et al. |
| 2007/0003204 A1 | 1/2007 | Makrides-Saravanos et al. |
| 2007/0025070 A1 | 2/2007 | Jiang et al. |
| 2007/0031099 A1 | 2/2007 | Herzog et al. |
| 2007/0033629 A1 | 2/2007 | McGranahan et al. |
| 2007/0047894 A1 | 3/2007 | Holmberg et al. |
| 2007/0104447 A1 | 5/2007 | Allen |
| 2007/0127201 A1 | 6/2007 | Mertesdorf et al. |
| 2007/0131628 A1 | 6/2007 | Mimlitch, III et al. |
| 2007/0189692 A1 | 8/2007 | Zimmel et al. |
| 2007/0196071 A1 | 8/2007 | Laursen et al. |
| 2007/0221793 A1 | 9/2007 | Kusuda |
| 2007/0237484 A1 | 10/2007 | Reagan et al. |
| 2007/0274718 A1 | 11/2007 | Bridges et al. |
| 2008/0011514 A1 | 1/2008 | Zheng et al. |
| 2008/0025683 A1 | 1/2008 | Murano |
| 2008/0031585 A1 | 2/2008 | Solheid |
| 2008/0063350 A1 | 3/2008 | Trebesch et al. |
| 2008/0068788 A1 | 3/2008 | Ozawa et al. |
| 2008/0069511 A1 | 3/2008 | Blackwell, Jr. et al. |
| 2008/0069512 A1 | 3/2008 | Barnes et al. |
| 2008/0080826 A1 | 4/2008 | Leon et al. |
| 2008/0080827 A1 | 4/2008 | Leon et al. |
| 2008/0080828 A1 | 4/2008 | Leon et al. |
| 2008/0085094 A1 | 4/2008 | Krampotich |
| 2008/0089656 A1 | 4/2008 | Wagner et al. |
| 2008/0095541 A1 | 4/2008 | Dallesasse |
| 2008/0100440 A1 | 5/2008 | Downie et al. |
| 2008/0106871 A1 | 5/2008 | James |
| 2008/0112681 A1 | 5/2008 | Battey et al. |
| 2008/0118207 A1 | 5/2008 | Yamamoto et al. |
| 2008/0121423 A1 | 5/2008 | Vogel et al. |
| 2008/0124039 A1 | 5/2008 | Gniadek et al. |
| 2008/0131068 A1 | 6/2008 | Mertesdorf et al. |
| 2008/0145013 A1 | 6/2008 | Escoto et al. |
| 2008/0152294 A1 | 6/2008 | Hirano et al. |
| 2008/0166094 A1 | 7/2008 | Bookbinder et al. |
| 2008/0166131 A1 | 7/2008 | Hudgins et al. |
| 2008/0175550 A1 | 7/2008 | Coburn et al. |
| 2008/0175551 A1 | 7/2008 | Smrha et al. |
| 2008/0175552 A1 | 7/2008 | Smrha et al. |
| 2008/0193091 A1 | 8/2008 | Herbst |
| 2008/0205823 A1 | 8/2008 | Luther |
| 2008/0205844 A1 | 8/2008 | Castonguay et al. |
| 2008/0212928 A1 | 9/2008 | Kowalczyk et al. |
| 2008/0219632 A1 | 9/2008 | Smith et al. |
| 2008/0219634 A1 | 9/2008 | Rapp et al. |
| 2008/0236858 A1 | 10/2008 | Quijano |
| 2008/0247723 A1 | 10/2008 | Herzog et al. |
| 2008/0267573 A1 | 10/2008 | Douglas et al. |
| 2008/0285934 A1 | 11/2008 | Standish et al. |
| 2008/0292261 A1 | 11/2008 | Kowalczyk et al. |
| 2008/0298763 A1 | 12/2008 | Appenzeller et al. |
| 2008/0304803 A1 | 12/2008 | Krampotich et al. |
| 2008/0310810 A1 | 12/2008 | Gallagher |
| 2009/0010607 A1 | 1/2009 | Elisson et al. |
| 2009/0016685 A1 | 1/2009 | Hudgins et al. |
| 2009/0022470 A1 | 1/2009 | Krampotich |
| 2009/0060439 A1 | 3/2009 | Cox et al. |
| 2009/0060440 A1 | 3/2009 | Wright et al. |
| 2009/0067800 A1 | 3/2009 | Vazquez et al. |
| 2009/0074371 A1 | 3/2009 | Bayazit et al. |
| 2009/0097813 A1 | 4/2009 | Hill |
| 2009/0136194 A1 | 5/2009 | Barnes |
| 2009/0136196 A1 | 5/2009 | Trebesch et al. |
| 2009/0146342 A1 | 6/2009 | Haney et al. |
| 2009/0148117 A1 | 6/2009 | Laurisch |
| 2009/0169163 A1 | 7/2009 | Abbott, III et al. |
| 2009/0175588 A1 | 7/2009 | Brandt et al. |
| 2009/0180749 A1 | 7/2009 | Douglas et al. |
| 2009/0185782 A1 | 7/2009 | Parikh et al. |
| 2009/0191891 A1 | 7/2009 | Ma et al. |
| 2009/0194647 A1 | 8/2009 | Keith |
| 2009/0196563 A1 | 8/2009 | Mullsteff et al. |
| 2009/0202214 A1 | 8/2009 | Holmberg et al. |
| 2009/0207577 A1 | 8/2009 | Fransen et al. |
| 2009/0208178 A1 | 8/2009 | Kowalczyk et al. |
| 2009/0208210 A1 | 8/2009 | Trojer et al. |
| 2009/0214171 A1 | 8/2009 | Coburn et al. |
| 2009/0220200 A1 | 9/2009 | Sheau Tung Wong et al. |
| 2009/0220204 A1 | 9/2009 | Ruiz |

(56) References Cited

U.S. PATENT DOCUMENTS

| | | |
|---|---|---|
| 2009/0226142 A1 | 9/2009 | Barnes et al. |
| 2009/0238531 A1 | 9/2009 | Holmberg et al. |
| 2009/0245743 A1 | 10/2009 | Cote et al. |
| 2009/0252472 A1 | 10/2009 | Solheid et al. |
| 2009/0257726 A1 | 10/2009 | Redmann et al. |
| 2009/0257727 A1 | 10/2009 | Laurisch et al. |
| 2009/0257754 A1 | 10/2009 | Theodoras, II et al. |
| 2009/0263096 A1 | 10/2009 | Solheid et al. |
| 2009/0263122 A1 | 10/2009 | Helkey et al. |
| 2009/0267865 A1 | 10/2009 | Miller et al. |
| 2009/0269016 A1 | 10/2009 | Korampally et al. |
| 2009/0269018 A1 | 10/2009 | Frohlich et al. |
| 2009/0274429 A1 | 11/2009 | Krampotich et al. |
| 2009/0274430 A1 | 11/2009 | Krampotich et al. |
| 2009/0274432 A1 | 11/2009 | Iwaya |
| 2009/0290842 A1 | 11/2009 | Bran de Leon et al. |
| 2009/0297111 A1 | 12/2009 | Reagan et al. |
| 2009/0304342 A1 | 12/2009 | Adomeit et al. |
| 2009/0324189 A1 | 12/2009 | Hill et al. |
| 2010/0003000 A1 | 1/2010 | Rapp et al. |
| 2010/0012671 A1 | 1/2010 | Vrondran et al. |
| 2010/0054681 A1 | 3/2010 | Biribuze et al. |
| 2010/0054682 A1 | 3/2010 | Cooke et al. |
| 2010/0054685 A1 | 3/2010 | Cooke et al. |
| 2010/0061691 A1 | 3/2010 | Murano et al. |
| 2010/0061693 A1 | 3/2010 | Bran de Leon et al. |
| 2010/0074587 A1 | 3/2010 | Loeffelholz et al. |
| 2010/0080517 A1 | 4/2010 | Cline et al. |
| 2010/0086274 A1 | 4/2010 | Keith |
| 2010/0111483 A1 | 5/2010 | Reinhardt et al. |
| 2010/0119201 A1 | 5/2010 | Smrha et al. |
| 2010/0142544 A1 | 6/2010 | Chapel et al. |
| 2010/0142910 A1 | 6/2010 | Hill et al. |
| 2010/0150518 A1 | 6/2010 | Leon et al. |
| 2010/0158467 A1 | 6/2010 | Hou et al. |
| 2010/0166377 A1 | 7/2010 | Nair et al. |
| 2010/0178022 A1* | 7/2010 | Schroeder et al. ............ 385/136 |
| 2010/0202745 A1* | 8/2010 | Sokolowski et al. ......... 385/135 |
| 2010/0220967 A1 | 9/2010 | Cooke et al. |
| 2010/0247051 A1 | 9/2010 | Kowalczyk et al. |
| 2010/0278499 A1 | 11/2010 | Mures et al. |
| 2010/0296790 A1 | 11/2010 | Cooke et al. |
| 2010/0310225 A1 | 12/2010 | Anderson et al. |
| 2010/0310226 A1 | 12/2010 | Wakileh et al. |
| 2010/0316334 A1 | 12/2010 | Kewitsch |
| 2010/0322582 A1 | 12/2010 | Cooke et al. |
| 2010/0322583 A1 | 12/2010 | Cooke et al. |
| 2011/0073730 A1 | 3/2011 | Kitchen |
| 2011/0085774 A1 | 4/2011 | Murphy et al. |
| 2011/0085776 A1 | 4/2011 | Biribuze et al. |
| 2011/0097053 A1 | 4/2011 | Smith et al. |
| 2011/0097977 A1 | 4/2011 | Bubnick et al. |
| 2011/0217016 A1 | 9/2011 | Mullsteff |
| 2011/0280537 A1 | 11/2011 | Cowen et al. |
| 2012/0051707 A1* | 3/2012 | Barnes et al. ................. 385/135 |
| 2012/0057838 A1 | 3/2012 | Hill et al. |
| 2012/0183263 A1 | 7/2012 | Wu |
| 2013/0077927 A1 | 3/2013 | O'Connor |

FOREIGN PATENT DOCUMENTS

| | | | |
|---|---|---|---|
| CH | 688705 | A5 | 1/1998 |
| DE | 8711970 | U1 | 10/1987 |
| DE | 3726718 | A1 | 2/1989 |
| DE | 3726719 | A1 | 2/1989 |
| DE | 4030301 | A1 | 3/1992 |
| DE | 4231181 | C1 | 8/1993 |
| DE | 20115940 | U1 | 1/2002 |
| DE | 10338848 | A1 | 3/2005 |
| DE | 202005009932 | U1 | 11/2005 |
| EP | 0250900 | A2 | 1/1988 |
| EP | 0408266 | A2 | 1/1991 |
| EP | 0474091 | A1 | 8/1991 |
| EP | 0468671 | A1 | 1/1992 |
| EP | 0490698 | A1 | 6/1992 |
| EP | 0529830 | A1 | 3/1993 |
| EP | 0544004 | A1 | 6/1993 |
| EP | 0547778 | A1 | 6/1993 |
| EP | 0581527 | A1 | 2/1994 |
| EP | 0620462 | A1 | 10/1994 |
| EP | 0693699 | A1 | 1/1996 |
| EP | 0720322 | A2 | 7/1996 |
| EP | 0940700 | A2 | 9/1999 |
| EP | 0949522 | A2 | 10/1999 |
| EP | 1041417 | A2 | 10/2000 |
| EP | 1056177 | A1 | 11/2000 |
| EP | 1065542 | A1 | 1/2001 |
| EP | 1203974 | A2 | 5/2002 |
| EP | 1289319 | A2 | 3/2003 |
| EP | 1316829 | A2 | 6/2003 |
| EP | 1777563 | A1 | 4/2007 |
| FR | 2378378 | A1 | 8/1978 |
| GB | 2241591 | A | 9/1991 |
| GB | 2277812 | A | 11/1994 |
| JP | 3172806 | A | 7/1991 |
| JP | 5045541 | A | 2/1993 |
| JP | 06018749 | A | 1/1994 |
| JP | 7308011 | A | 11/1995 |
| JP | 8007308 | A | 1/1996 |
| JP | 8248235 | A | 9/1996 |
| JP | 8248237 | A | 9/1996 |
| JP | 3487946 | A | 10/1996 |
| JP | 8254620 | A | 10/1996 |
| JP | 3279474 | A | 10/1997 |
| JP | 9258033 | A | 10/1997 |
| JP | 9258055 | A | 10/1997 |
| JP | 2771870 | B2 | 7/1998 |
| JP | 3448448 | A | 8/1998 |
| JP | 10227919 | A | 8/1998 |
| JP | 3478944 | A | 12/1998 |
| JP | 10332945 | A | 12/1998 |
| JP | 10339817 | A | 12/1998 |
| JP | 11023858 | A | 1/1999 |
| JP | 2000098138 | A | 4/2000 |
| JP | 2000098139 | A | 4/2000 |
| JP | 2000241631 | A | 9/2000 |
| JP | 2001004849 | A | 1/2001 |
| JP | 3160322 | B2 | 4/2001 |
| JP | 2001133636 | A | 5/2001 |
| JP | 3173962 | B2 | 6/2001 |
| JP | 3176906 | B2 | 6/2001 |
| JP | 2001154030 | A | 6/2001 |
| JP | 2001159714 | A | 6/2001 |
| JP | 2002022974 | A | 1/2002 |
| JP | 2002169035 | A | 6/2002 |
| JP | 3312893 | B2 | 8/2002 |
| JP | 2002305389 | A | 10/2002 |
| JP | 3344701 | B2 | 11/2002 |
| JP | 2003029054 | A | 1/2003 |
| JP | 3403573 | B2 | 5/2003 |
| JP | 2003169026 | A | 6/2003 |
| JP | 2003215353 | A | 7/2003 |
| JP | 2003344701 | A | 12/2003 |
| JP | 3516765 | B2 | 4/2004 |
| JP | 2004144808 | A | 5/2004 |
| JP | 2004514931 | A | 5/2004 |
| JP | 3542939 | B2 | 7/2004 |
| JP | 2004246147 | A | 9/2004 |
| JP | 2004361652 | A | 12/2004 |
| JP | 2004361893 | A | 12/2004 |
| JP | 3107704 | U | 2/2005 |
| JP | 2005055748 | A | 3/2005 |
| JP | 2005062569 | A | 3/2005 |
| JP | 2005084241 | A | 3/2005 |
| JP | 2005148327 | A | 6/2005 |
| JP | 3763645 | B2 | 4/2006 |
| JP | 3778021 | B2 | 5/2006 |
| JP | 2006126513 | A | 5/2006 |
| JP | 2006126516 | A | 5/2006 |
| JP | 3794540 | B2 | 7/2006 |
| JP | 2006227041 | A1 | 8/2006 |
| JP | 3833638 | B2 | 10/2006 |
| JP | 3841344 | B2 | 11/2006 |

(56) References Cited

FOREIGN PATENT DOCUMENTS

| | | |
|---|---|---|
| JP | 3847533 B2 | 11/2006 |
| JP | 200747336 A | 2/2007 |
| JP | 3896035 B2 | 3/2007 |
| JP | 2007067458 A1 | 3/2007 |
| JP | 3934052 B2 | 6/2007 |
| JP | 3964191 B2 | 8/2007 |
| JP | 3989853 B2 | 10/2007 |
| JP | 4026244 B2 | 12/2007 |
| JP | 4029494 B2 | 1/2008 |
| JP | 4065223 B2 | 3/2008 |
| JP | 4093475 B2 | 6/2008 |
| JP | 4105696 B2 | 6/2008 |
| JP | 4112437 B2 | 7/2008 |
| JP | 4118862 B2 | 7/2008 |
| JP | 2008176118 A1 | 7/2008 |
| JP | 2008180817 A1 | 8/2008 |
| JP | 4184329 B2 | 11/2008 |
| JP | 2008542822 T | 11/2008 |
| JP | 2009503582 T | 1/2009 |
| WO | 9105281 A1 | 4/1991 |
| WO | 9326070 A1 | 12/1993 |
| WO | 9520175 A1 | 7/1995 |
| WO | 9636896 A1 | 11/1996 |
| WO | 9712268 A1 | 4/1997 |
| WO | 9744605 A1 | 11/1997 |
| WO | 9825416 A1 | 6/1998 |
| WO | 0005611 A2 | 2/2000 |
| WO | 0127660 A2 | 4/2001 |
| WO | 0242818 A1 | 5/2002 |
| WO | 03009527 A2 | 1/2003 |
| WO | 2004052066 A1 | 6/2004 |
| WO | 2007050515 A1 | 5/2007 |
| WO | 2007079074 A2 | 7/2007 |
| WO | 2007149215 A2 | 12/2007 |
| WO | 2008063054 A2 | 5/2008 |
| WO | 2009120280 A2 | 10/2009 |

OTHER PUBLICATIONS

Annex to Form PCT/ISA/206, Communication Relating to the Results of the Partial International Search, for PCT/US2009/004548 mailed Jan. 19, 2010, 2 pages.
Corning Cable Systems, "Corning Cable Systems Products for BellSouth High Density Shelves," Jun. 2000, 2 pages.
Corning Cable Systems, "Corning Cable Systems Quick Reference Guide for Verizon FTTP FDH Products," Jun. 2005, 4 pages.
Conner, M. "Passive Optical Design for RFOG and Beyond," Braodband Properties, Apr. 2009, pp. 78-81.
Corning Evolant, "Eclipse Hardware Family," Nov. 2009, 1 page.
Corning Evolant, "Enhanced Management Frame," Dec. 2009, 1 page.
Corning Evolant, "Enhanced Management Frame (EMF)," Specification Sheet, Nov. 2009, 24 pages.
Corning Cable Systems, "Evolant Solutions for Evolving Networks: Fiber Optic Hardware," Oct. 2002, 2 pages.
Corning Cable Systems, "Fiber Optic Hardware with Factory-Installed Pigtails: Features and Benefits," Nov. 2010, 12 pages.
Corning Cable Systems, "FiberManager System 1- and 3-Position Compact Shelves," Jan. 2003, 4 pages.
Corning Cable Systems, "FiberManager System Frame and Components," Jan. 2003, 12 pages.
Corning Cable Systems, "High Density Frame," Jul. 2001, 2 pages.
Corning Cable Systems, "High Density Frame (HDF) Connector-Splice Shelves and Housings," May 2003, 4 pages.
International Search Report for PCT/US10/35529 mailed Jul. 23, 2010, 2 pages.
International Search Report for PCT/US10/35563 mailed Jul. 23, 2012, 1 page.
International Search Report for PCT/US2008/002514 mailed Aug. 8, 2008, 2 pages.
International Search Report for PCT/US2008/010317 mailed Mar. 4, 2008, 2 pages.
International Search Report for PCT/US2009/001692 mailed Nov. 24, 2009, 5 pages.
International Search Report for PCT/US2010/024888 mailed Jun. 23, 2010, 5 pages.
International Search Report for PCT/US2010/027402 mailed Jun. 16, 2010, 2 pages.
Corning Cable Systems, "MTX Frames and Accessories," Feb. 2006, 4 pages.
Panduit, "Lock-in LC Duplex Clip," Accessed Mar. 22, 2012, 1 page.
International Search Report for PCT/US06/49351 mailed Apr. 25, 2008, 1 page.
International Search Report for PCT/US09/57069 mailed Mar. 24, 2010, 2 pages.
International Search Report for PCT/US2009/057244 mailed Nov. 9, 2009 3 pages.
International Search Report for PCTUS2009004548 mailed Mar. 19, 2010, 5 pages.
International Search Report for PCTUS2009004549 mailed Apr. 20, 2010, 6 pages.
Siecor, "Single Shelf HDF with Slack Storage and Heat Shield (HH1-CSH-1238-1V-BS)," Jan. 1998, 12 pages.
Corning Cable Systems, "Mass Termination Xchange (MTX) Frame System Equipment Office Planning and Application Guide," SRP003-664, Issue 1, Mar. 2005, 57 pages.
Corning Cable Systems, "Mass Termination Xchange (MTX) Equipment Patch Cord Interbay Vertical Channel," SRP003-684, Issue 1, Mar. 2005, 8 pages.
Corning Cable Systems, "High Density Frame (HDF) Installation," SRP003-355, Issue 4, Sep. 2002, 18 pages.
Written Opinion for PCT/US2010/023901 mailed Aug. 25, 2011, 8 pages.
Advisory Action for U.S. Appl. No. 12/221,117 mailed Aug. 24, 2011, 3 pages.
Examiner's Answer to Appeal Brief for U.S. Appl. No. 12/221,117 mailed Mar. 29, 2012, 16 pages.
Final Office Action for U.S. Appl. No. 12/221,117 mailed Feb. 19, 2010, 7 pages.
Final Office Action for U.S. Appl. No. 12/221,117 mailed Jun. 10, 2011, 8 pages.
Non-final Office Action for U.S. Appl. No. 12/221,117 mailed Jul. 14, 2010, 7 pages.
Non-final Office Action for U.S. Appl. No. 12/221,117 mailed Jun. 9, 2009, 5 pages.
Non-final Office Action for U.S. Appl. No. 12/221,117 mailed Dec. 21, 2010, 7 pages.
Advisory Action for U.S. Appl. No. 12/394,483 mailed Feb. 16, 2012, 3 pages.
Final Office Action for U.S. Appl. No. 12/394,483 mailed Dec. 6, 2011, 14 pages.
Non-final Office Action for U.S. Appl. No. 12/394,483 mailed Jun. 17, 2011, 11 pages.
Advisory Action for U.S. Appl. No. 12/950,234 mailed Dec. 21, 2011, 3 pages.
Non-final Office Action for U.S. Appl. No. 12/950,234 mailed Jun. 17, 2011, 7 pages.
Non-final Office Action for U.S. Appl. No. 12/950,234 mailed Mar. 12, 2012, 10 pages.
Final Office Action for U.S. Appl. No. 12/950,234 mailed Oct. 14, 2011, 10 pages.
Advisory Action mailed May 12, 2011, for U.S. Appl. No. 12/323,423, 3 pages.
Final Rejection mailed Mar. 3, 2011, for U.S. Appl. No. 12/323,423, 17 pages.
Non-Final Rejection mailed Aug. 5, 2011, for U.S. Appl. No. 12/323,423, 13 pages.
Non-Final Rejection mailed Sep. 7, 2010, for U.S. Appl. No. 12/323,423, 18 pages.
Notice of Allowance for U.S. Appl. No. 12/323,423 mailed Jan. 24, 2012, 8 pages.
Examiner's Answer mailed Mar. 4, 2011, for U.S. Appl. No. 12/323,415, 11 pages.
Final Rejection mailed Jun. 25, 2010, for U.S. Appl. No. 12/323,415, 10 pages.

(56) References Cited

OTHER PUBLICATIONS

Non-Final Rejection mailed Aug. 5, 2011, for U.S. Appl. No. 12/323,415, 41 pages.
Non-final Office Action for U.S. Appl. No. 12/323,415 mailed Apr. 23, 2012, 11 pages.
Non-Final Rejection mailed Dec. 10, 2009, for U.S. Appl. No. 12/323,415, 7 pages.
Examiner's Answer to Appeal Brief for U.S. Appl. No. 11/320,062 mailed Dec. 8, 2011, 8 pages.
Final Office Action for U.S. Appl. No. 11/320,062 mailed Mar. 8, 2011, 8 pages.
Non-final Office Action for U.S. Appl. No. 11/320,062 mailed Jan. 15, 2010, 11 pages.
Non-final Office Action for U.S. Appl. No. 12/320,062 mailed Sep. 30, 2010, 7 pages.
Final Office Action for U.S. Appl. No. 11/439,086 mailed Feb. 4, 2010, 14 pages.
Non-final Office Action for U.S. Appl. No. 11/439,086 mailed May 3, 2010, 11 pages.
Non-final Office Action for U.S. Appl. No. 11/439,086 mailed Sep. 21, 2009, 10 pages.
Final Office Action for U.S. Appl. No. 12/079,481 mailed Mar. 18, 2010, 10 pages.
Non-final Office Action for U.S. Appl. No. 12/079,481 mailed Dec. 26, 2008, 9 pages.
Non-final Office Action for U.S. Appl. No. 12/079,481 mailed Sep. 16, 2009, 10 pages.
Notice of Allowance for U.S. Appl. No. 12/079,481 mailed Jun. 3, 2010, 6 pages.
Notice of Allowance for U.S. Appl. No. 12/079,481 mailed Oct. 4, 2010, 4 pages.
Final Office Action for U.S. Appl. No. 12/394,114 mailed Dec. 22, 2011, 8 pages.
Non-final Office Action for U.S. Appl. No. 12/394,114 mailed Mar. 16, 2012, 8 pages.
Non-final Office Action for U.S. Appl. No. 12/394,114 mailed Sep. 1, 2011, 7 pages.
Non-final Office Action for U.S. Appl. No. 12/323,373 mailed May 3, 2012, 7 pages.
Non-final Office Action for U.S. Appl. No. 11/809,474 mailed Apr. 8, 2008, 13 pages.
Non-final Office Action for U.S. Appl. No. 11/809,474 mailed Nov. 13, 2008, 10 pages.
Notice of Allowance for U.S. Appl. No. 11/809,474 mailed Jul. 6, 2009, 6 pages.
Final Office Action for U.S. Appl. No. 11/320,031 mailed Mar. 8, 2011, 8 pages.
Non-final Office Action for U.S. Appl. No. 11/320,031 mailed Jan. 5, 2010, 16 pages.
Non-final Office Action for U.S. Appl. No. 11/320,031 mailed Sep. 30, 2010, 7 pages.
Notice of Allowance for U.S. Appl. No. 11/320,031 mailed Nov. 15, 2011, 7 pages.
Non-final Office Action for U.S. Appl. No. 12/157,622 mailed Mar. 31, 2009, 9 pages.
Non-final Office Action for U.S. Appl. No. 12/157,622 mailed Oct. 15, 2009, 9 pages.
Notice of Allowance for U.S. Appl. No. 12/157,622 mailed Apr. 22, 2010, 4 pages.
Non-final Office Action for U.S. Appl. No. 12/323,395 mailed Dec. 8, 2011, 7 pages.
Non-final Office Action for U.S. Appl. No. 12/415,454 mailed Mar. 2, 2012, 5 pages.
Non-final Office Action for U.S. Appl. No. 12/415,454 mailed Sep. 6, 2011, 7 pages.
Notice of Allowance for U.S. Appl. No. 12/415,454 mailed Jan. 13, 2012, 5 pages.
Non-final Office Action for U.S. Appl. No. 12/576,769 mailed Feb. 2, 2012, 23 pages.
Notice of Allowance for U.S. Appl. No. 12/415,454 mailed Jun. 19, 2012, 5 pages.
Unknown, Author, "QuickNet SFQ Series MTP Fiber Optic Cassettes," Panduit Specification Sheet, Jan. 2009, 2 pages.
Unknown Author, "Cellular Specialties introduces the first simulated in-building location-based tracking solution," smart-grid.tmenet.com/news, Sep. 14, 2009, 2 pages.
Unknown Author, "CDMA Co-Pilot Transmitter," Cellular Specialties, Inc., Aug. 2009, 2 pages.
International Search Report for PCT/US2010/038986 mailed Aug. 18, 2010, 1 page.
International Search Report for PCT/US2009/066779 mailed Aug. 27, 2010, 3 pages.
"MPO Fiber Optic Rack Panels now available from L-com Connectivity Products," article dated Jun. 4, 2007, 16 pages, http://www.l-com.com/content/Article.aspx?Type=P&ID=438.
"19" Rack Panel with 16 MPO Fiber Optic Couplers—1U high," product page, accessed Oct. 23, 2012, 2 pages, http://www.l-com.com/item.aspx?id=9767#.UlbgG8XXay5.
"Drawing for L-com 1U Panel with 16 MTP couplers," May 15, 2007, 1 page, http://www.l-com.com/multimedia/eng_drawings/PR17516MTP.pdf.
"RapidNet Fibre MTP VHD Cassette," Brochure, Date Unknown, 1 page, http://www.hellermanntyton.se/documents/5000/576_fiber_1U.pdf.
"MPO for Gigabit Ethernet/FAS-NET MTP Solution," Brochure, Date Unknown, 11 pages, http://www.infinique.com/upload/13182286190.pdf.
"Hubbell OptiChannel High Density 144 Port 1U Fiber Enclosure," Brochure, Date Unknown, 2 pages, http://www.hubbell-premise.com/literature/PLDF010.pdf.
Non-final Office Action for U.S. Appl. No. 12/771,473 mailed Oct. 4, 2012, 6 pages.
Non-final Office Action for U.S. Appl. No. 12/819,081 mailed Aug. 21, 2012, 12 pages.
Notice of Allowance for U.S. Appl. No. 12/417,325 mailed Aug. 22, 2012, 7 pages.
Notice of Panel Decision for Pre-Appeal Brief for U.S. Appl. No. 12/417,325 mailed Aug. 8, 2012, 2 pages.
Advisory Action for U.S. Appl. No. 12/417,325 mailed Jun. 29, 2012, 3 pages.
Advisory Action for U.S. Appl. No. 12/417,325 mailed Jun. 12, 2012, 3 pages.
Final Office Action for U.S. Appl. No. 12/417,325 mailed Apr. 16, 2012, 6 pages.
Final Office Action for U.S. Appl. No. 12/417,325 mailed Feb. 7, 2012, 7 pages.
Non-final Office Action for U.S. Appl. No. 12/417,325 mailed Jun. 15, 2011, 6 pages.
Notice of Allowance for U.S. Appl. No. 12/487,929 mailed Sep. 12, 2012, 4 pages.
Notice of Allowance for U.S. Appl. No. 12/487,929 mailed Jun. 13, 2012, 8 pages.
Advisory Action for U.S. Appl. No. 12/487,929 mailed Apr. 17, 2012, 3 pages.
Final Office Action for U.S. Appl. No. 12/487,929 mailed Feb. 14, 2012, 6 pages.
Final Office Action for U.S. Appl. No. 12/487,929 mailed Dec. 5, 2011, 7 pages.
Non-final Office Action for U.S. Appl. No. 12/487,929 mailed May 23, 2011, 7 pages.
Notice of Allowance for U.S. Appl. No. 12/415,253 mailed Mar. 11, 2011, 7 pages.
Non-final Office Action for U.S. Appl. No. 12/415,253 mailed Jul. 12, 2010, 11 pages.
Final Office Action for U.S. Appl. No. 12/415,253 mailed Apr. 16, 2010, 9 pages.
Non-final Office Action for U.S. Appl. No. 12/415,253 mailed Sep. 30, 2009, 8 pages.
Non-final Office Action for U.S. Appl. No. 12/641,617 mailed Oct. 5, 2012, 21 pages.
Final Office Action for U.S. Appl. No. 12/630,938 mailed Jun. 1, 2012, 18 pages.

(56) References Cited

OTHER PUBLICATIONS

Non-final Office Action for U.S. Appl. No. 12/630,938 mailed Dec. 19, 2011, 15 pages.
Non-final Office Action for U.S. Appl. No. 12/751,884 mailed Jul. 2, 2012, 9 pages.
Non-final Office Action for U.S. Appl. No. 12/871,052 mailed Aug. 13, 2012, 8 pages.
International Search Report for PCT/US2010/023901 mailed Jun. 11, 2010, 3 pages.
Notice of Allowance for U.S. Appl. No. 12/576,769 mailed May 31, 2012, 9 pages.
Non-final Office Action for U.S. Appl. No. 12/576,806 mailed Dec. 13, 2011, 6 pages.
Notice of Allowance for U.S. Appl. No. 12/576,806 mailed Apr. 18, 2012, 5 pages.
Notice of Allowance for U.S. Appl. No. 13/090,621 mailed Apr. 22, 2013, 8 pages.
Final Office Action for U.S. Appl. No. 12/953,039 mailed May 1, 2013, 8 pages.
Final Office Action for U.S. Appl. No. 12/953,118 mailed May 3, 2013, 11 pages.
Final Office Action for U.S. Appl. No. 12/915,682 mailed Apr. 18, 2013, 9 pages.
Advisory Action for U.S. Appl. No. 12/952,960 mailed May 15, 2013, 2 pages.
Non-final Office Action for U.S. Appl. No. 12/952,960 mailed Jun. 20, 2013, 13 pages.
Non-final Office Action for U.S. Appl. No. 12/953,536 mailed Jun. 6, 2013, 21 pages.
Non-final Office Action for U.S. Appl. No. 11/820,300 mailed Apr. 25, 2012, 10 pages.
Final Office Action for U.S. Appl. No. 12/871,052 mailed Jul. 1, 2013, 12 pages.
Non-final Office Action for U.S. Appl. No. 12/940,699 mailed Jun. 26, 2013, 9 pages.
Notice of Allowance for U.S. Appl. No. 13/090,621 mailed Jun. 25, 2013, 8 pages.
Examination Report for European patent application 09789090.9-2216 mailed Aug. 29, 2011, 4 pages.
Examination Report for European patent application 09789090.9-2216 mailed Mar. 30, 2012, 6 pages.
Written Opinion of the International Searching Authority for International patent application PCT/US2009004548, mailed Apr. 5, 2011, 6 pages.
European Search Report for European patent application 09789090.9-2217 mailed Jan. 24, 2013, 5 pages.
Final Office Action for U.S. Appl. No. 12/394,114 mailed Oct. 25, 2012, 8 pages.
Non-final Office Action for U.S. Appl. No. 12/953,134 mailed Sep. 25, 2012, 8 pages.
Final Office Action for U.S. Appl. No. 12/818,986 mailed Oct. 18, 2012, 13 pages.
Non-final Office Action for U.S. Appl. No. 12/818,986 mailed Feb. 3, 2012, 12 pages.
Non-final Office Action for U.S. Appl. No. 12/732,487 mailed Sep. 19, 2012, 22 pages.
Non-final Office Action for U.S. Appl. No. 12/952,960 mailed Oct. 4, 2012, 11 pages.
Non-final Office Action for U.S. Appl. No. 12/915,682 mailed Oct. 24, 2012, 8 pages.
Non-final Office Action for U.S. Appl. No. 12/953,039 mailed Jan. 11, 2013, 6 pages.
Non-final Office Action for U.S. Appl. No. 12/952,912 mailed Dec. 28, 2012, 9 pages.
Non-final Office Action for U.S. Appl. No. 12/953,118 mailed Jan. 7, 2013, 9 pages.
Non-final Office Action for U.S. Appl. No. 12/953,536 mailed Jan. 2, 2013, 20 pages.
Non-final Office Action for U.S. Appl. No. 12/707,889 mailed Jan. 2, 2013, 7 pages.
Non-final Office Action for U.S. Appl. No. 12/946,139 mailed Jul. 26, 2012, 12 pages.
European Search Report for patent application 10790017.7 mailed Nov. 8, 2012, 7 pages.
Final Office Action for U.S. Appl. No. 12/946,139 mailed Feb. 15, 2013, 17 pages.
Non-final Office Action for U.S. Appl. No. 12/751,884 mailed Feb. 15, 2013, 5 pages.
Non-final Office Action for U.S. Appl. No. 12/394,114 mailed Feb. 27, 2013, 8 pages.
Non-final Office Action for U.S. Appl. No. 12/819,065 mailed Mar. 4, 2013, 7 pages.
Final Office Action for U.S. Appl. No. 12/952,960 mailed Mar. 7, 2013, 13 pages.
Notice of Allowance for U.S. Appl. No. 12/732,487 mailed Mar. 19, 2013, 11 pages.
Non-final Office Action for U.S. Appl. No. 12/953,134 mailed Mar. 21, 2013, 9 pages.
Final Office Action for U.S. Appl. No. 12/641,617 mailed May 10, 2013, 21 pages.
Non-final Office Action for U.S. Appl. No. 12/956,475 mailed Oct. 4, 2012, 7 pages.
Final Office Action for U.S. Appl. No. 12/952,912 mailed Aug. 30, 2013, 15 pages.
Advisory Action for U.S. Appl. No. 12/771,473 mailed Oct. 2, 2013, 3 pages.
Notice of Allowance for U.S. Appl. No. 12/641,617 mailed Sep. 4, 2013, 9 pages.
Non-final Office Action for U.S. Appl. No. 12/953,039 mailed Sep. 12, 2013, 8 pages.
Non-final Office Action for U.S. Appl. No. 12/946,139 mailed Oct. 2, 2013, 18 pages.
Final Office Action for U.S. Appl. No. 12/394,114 mailed Oct. 4, 2013, 10 pages.
Non-final Office Action for U.S. Appl. No. 12/818,986 mailed Oct. 4, 2013, 19 pages.
Non-final Office Action for U.S. Appl. No. 13/901,074 mailed Oct. 9, 2013, 6 pages.
Advisory Action for U.S. Appl. No. 12/953,134 mailed Nov. 4, 2013, 3 pages.
Final Office Action for U.S. Appl. No. 12/952,960 mailed Oct. 29, 2013, 8 pages.
Notice of Allowance for U.S. Appl. No. 13/292,130 mailed Oct. 18, 2013, 9 pages.
Non-final Office Action for U.S. Appl. No. 13/302,067 mailed Jun. 7, 2013, 13 pages.
Notice of Allowance for U.S. Appl. No. 12/751,884 mailed Jul. 17, 2013, 8 pages.
Non-final Office Action for U.S. Appl. No. 12/940,585 mailed Aug. 16, 2013, 14 pages.
Final Office Action for U.S. Appl. No. 12/953,134 mailed Aug. 23, 2013, 11 pages.
Ex parte Quayle Action for U.S. Appl. No. 12/953,164 mailed Aug. 16, 2013, 5 pages.
Non-final Office Action for U.S. Appl. No. 12/732,487 mailed Jul. 17, 2013, 22 pages.
Non-final Office Action and Interview Summary for U.S. Appl. No. 12/707,889 mailed Aug. 8, 2013, 15 pages.
Advisory Action for U.S. Appl. No. 12/953,039 mailed Jul. 12, 2013, 3 pages.
Advisory Action for U.S. Appl. No. 12/953,118 mailed Jul. 12, 2013, 3 pages.
Advisory Action for U.S. Appl. No. 12/641,617 mailed Jul. 29, 2013, 3 pages.
Final Office Action for U.S. Appl. No. 12/771,473 mailed Jul. 19, 2013, 7 pages.
Advisory Action for U.S. Appl. No. 12/394,114 mailed Jan. 2, 2014, 3 pages.
Final Office Action for U.S. Appl. No. 12/953,039 mailed Dec. 27, 2013, 10 pages.

(56) References Cited

OTHER PUBLICATIONS

Advisory Action for U.S. Appl. No. 12/952,960 mailed Jan. 8, 2014, 3 pages.
Advisory Action for U.S. Appl. No. 12/952,912 mailed Nov. 26, 2013, 3 pages.
Examiner's Answer to the Appeal Brief for U.S. Appl. No. 12/953,118 mailed Dec. 3, 2013, 6 pages.
Non-final Office Action for U.S. Appl. No. 13/597,549 mailed Jan. 14, 2014, 9 pages.
Final Office Action for U.S. Appl. No. 12/732,487 mailed Dec. 6, 2013, 24 pages.
Final Office Action for U.S. Appl. No. 12/956,446 mailed Dec. 23, 2013, 12 pages.
Non-final Office Action for U.S. Appl. No. 12/953,536 mailed Dec. 17, 2013, 21 pages.
Non-final Office Action for U.S. Appl. No. 12/819,065 mailed Dec. 3, 2013, 8 pages.
Author Unknown, "144 Fiber Patch Panel 1U," Technical Data, ADTEK Group Limited, 2009, 2 pages.

* cited by examiner

METHODS, APPARATUSES FOR PROVIDING SECURE FIBER OPTIC CONNECTIONS

BACKGROUND

1. Technical Field

The field of the disclosure relates to providing secure fiber optic connections, and in particular, including in or out of fiber optic adapter panels, fiber optic modules, fiber optic terminals, and/or parking lot compartments in fiber optic terminals.

2. Technical Background

To provide improved performance to subscribers, communication and data networks are increasingly employing optical fiber. The benefits of optical fiber are well known and include higher signal-to-noise ratios and increased bandwidth. To further improve performance, fiber optic networks are increasingly providing optical fiber connectivity all the way to end subscribers. These initiatives include various fiber-to-the-premises (FTTP), fiber-to-the-home (FTTH), and other fiber initiatives (generally described as FTTx).

In this regard, FIG. 1 illustrates an exemplary fiber optic network 10. The fiber optic network 10 provides optical signals from switching points 12 over a distribution network 13 comprised of fiber optic feeder cables 14. The optical signals may be carried over the fiber optic feeder cables 14 to local convergence points (LCPs) 16. The LCPs 16 act as consolidation points for splicing, making cross-connections and interconnections, as well as providing locations for couplers and splitters. Fiber optic cables 18, such as distribution cables, exit the LCPs 16 to carry optical signals between the LCPs 16 and one or more intermediate Fiber Distribution Terminals (FDTs) 22.

Because LCPs 16 are typically configured to service multiple premises 20, the fiber optic cables 18 leaving the LCPs 16 are typically run to the FDTs 22. The FDTs 22 facilitate FTTx applications by providing network access points to the fiber optic network 10 to groupings of subscribers' premises 20. Typical subscriber premises 20 include single-dwelling units (SDU), multi-dwelling units (MDU), businesses, and/or other facilities or buildings.

Optical interconnections to the subscribers' premises 20 are typically provided via indoor/outdoor drop cables 24 that are optically interconnected with the fiber optic cables 18 within the FDTs 22. The FDTs 22 also provide a consolidated location for technicians or other installation personnel to make and protect splices between the drop cables 24 and the fiber optic cables 18 as opposed to making splices in sporadic locations.

There may be a number of fiber optic adapter panels and/or modules in the LCPs or FDTs. Given the number of optical interconnections in the LCPs or FDTs, one concern is that improper connections or disconnections of fiber optic cables to the fiber optic adapter panels or modules may occur. There may be little to no control over physical access such that anyone with access to the LCPs or FDTs or other locations where a fiber optic cable is terminated has the ability to change the configuration of the fiber optic cables. The improper connections or disconnections may be inadvertent or malicious. Inadvertent connections or disconnections can cause network downtime. Malicious connections or disconnections can facilitate traffic filtering, sniffing, or mirroring, and is a security risk. Thus, there is a need to be able to secure fiber optic connectors to a fiber optic adapter panel and/or lock the connectors out of a fiber optic adapter panel or module.

In addition, Passive Optical Network (PON) technology has been developed for FTTH applications in access networks. However, only fairly recently has this technology been available at affordable costs. This technology has now been adopted in more than 12 million homes. A core element of the PON is an optical splitter with a central (single) split or a distributed (two-step) split architecture. The splitter in central split architecture is typically placed in a fiber optic cabinet or terminal. In addition, premises cabling may provide for fiber-to-the-desk (FTTD) applications in local area networks (LANs). Here, a special security requirement may be necessary because the LANs could be used in military, government or high-security research areas. In these high-security networks, it is common practice to have different physical or logical networks within a general, overall network. Due to the nature of the PON system, all signals are available on all ports at the end-user side of the optical splitter. This represents a security risk if not all ports are used or connected. Thus, there is also a need to secure the unused ports on the end-user side of the optical splitter in these PON systems.

SUMMARY OF THE DETAILED DESCRIPTION

Embodiments disclosed in the detailed description include methods and apparatuses for providing secure fiber optic connections. In this regard in one embodiment, a locking apparatus configured to secure a fiber optic adapter panel, a fiber optic module, or fiber optic connections is provided. The locking apparatus comprises a locking plate comprising at least one cut-out area and at least one finger portion. The locking plate is further configured to be adjustably positioned in a selected position such that when a fiber optic connector on an end of a fiber optic cable is connected to at least one fiber optic adapter, the fiber optic cable is allowed to pass through the cut-out area of the locking plate but the at least one finger portion of the locking plate does not allow the fiber optic connector to pass through the cut-out area of the locking plate. A lock disposed on the locking plate is configured to keep the locking plate in the selected position after the locking plate has been adjustably positioned in the selected position.

According to another embodiment, a locking apparatus may be used to securely store unused or unconnected ports of an optical splitter in a separate enclosure, such as a parking lot compartment in one embodiment. The apparatus comprises at least one parking lot compartment comprising one or more parking lot adapters configured to receive one or more unused or unconnected optical fibers split by an optical splitter. The one or more unused or unconnected optical fibers are parked in the one or more parking lot adapters using one or more respective fiber optic connectors disposed on the end of one or more respective fiber optic cables comprising the one or more unused or unconnected optical fibers. The locking apparatus also comprises a lock configured to prevent access to the one or more parking lot adapters.

In another embodiment, a method of securing fiber optic connections using the disclosed locking apparatus is also disclosed. The method includes providing a locking plate comprising at least one cut-out area and at least one finger portion. The method further comprises positioning the locking plate in a selected position such that when a fiber optic connector on an end of a fiber optic cable is connected to at least one fiber optic connector, the fiber optic cable is allowed to pass through the cut-out area of the locking plate but the fiber optic connector is not allowed to pass through the cut-out area of the locking plate. A lock is provided on the locking plate to keep the locking plate in a selected position.

The disclosed apparatuses and method allow fiber optic connectors to be locked in or out of a fiber optic adapter panel or other fiber optic module. One advantage of the disclosed locking mechanism is that it may be used for any standard fiber optic connector (including, but not limited to SC, LC, ST, MTP, etc.), which reduces the need for different solutions. In addition, the locking apparatus can be used as both a lock-in and lock-out device, instead of requiring different devices for each function.

Additional features and advantages of the invention will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description of embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operation of the invention.

DETAILED DESCRIPTION

Figure 1:
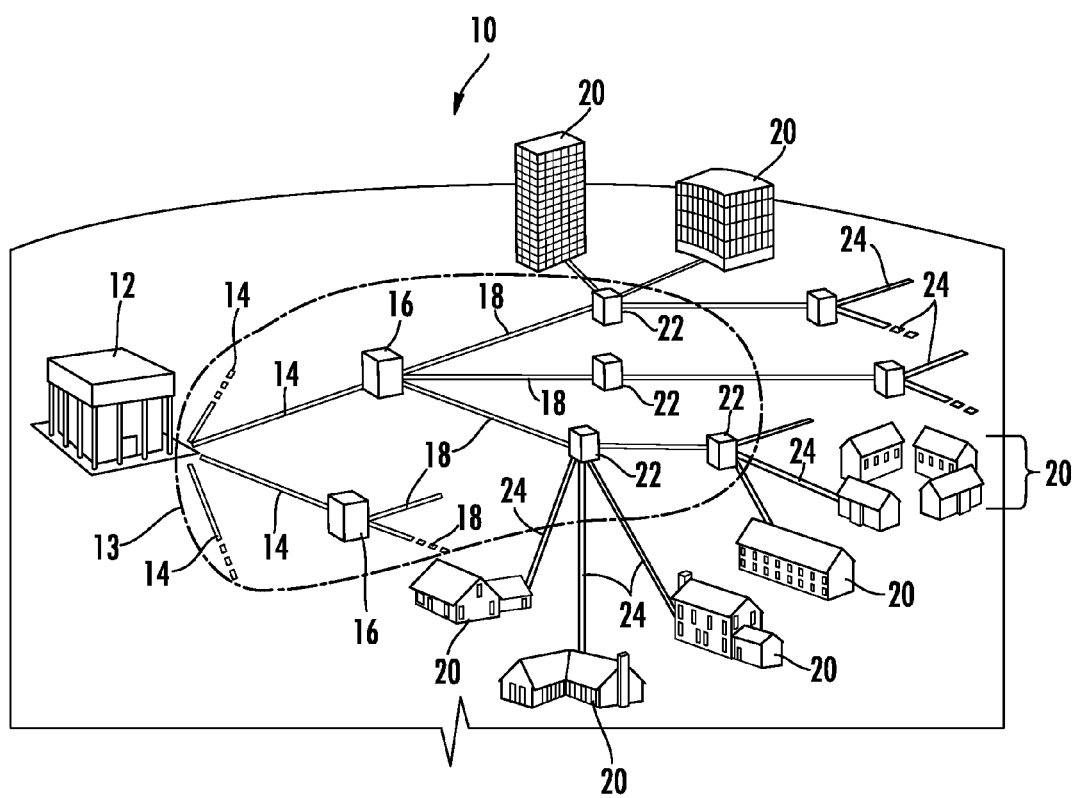
FIG. 1 is a schematic illustration of an exemplary fiber optic network which includes fiber optic terminals for carrying optical signals over the fiber optic network.

Reference will now be made in detail to the preferred embodiments of the present invention, examples of which are illustrated in the accompanying drawings. Whenever possible, like reference numbers will be used to refer to like components or parts.

Embodiments disclosed in the detailed description include methods and apparatuses for providing secure fiber optic connections. In this regard in one embodiment, a locking apparatus configured to secure a fiber optic adapter panel, a fiber optic module, or fiber optic connections is provided. The locking apparatus comprises a locking plate comprising at least one cut-out area and at least one finger portion. The locking plate is further configured to be adjustably positioned in a selected position such that when a fiber optic connector on an end of a fiber optic cable is connected to at least one fiber optic adapter, the fiber optic cable is allowed to pass through the cut-out area of the locking plate but the at least one finger portion of the locking plate does not allow the fiber optic connector to pass through the cut-out area of the locking plate. A lock disposed on the locking plate is configured to keep the locking plate in the selected position after the locking plate has been adjustably positioned in the selected position.

According to another embodiment, a locking apparatus may be used to securely store unused or unconnected ports of an optical splitter in a separate enclosure, such as a parking lot compartment in one embodiment. The apparatus comprises at least one parking lot compartment comprising one or more parking lot adapters configured to receive one or more unused or unconnected optical fibers split by an optical splitter. The one or more unused or unconnected optical fibers are parked in the one or more parking lot adapters using one or more respective fiber optic connectors disposed on the end of one or more respective fiber optic cables comprising the one or more unused or unconnected optical fibers. The locking apparatus also comprises a lock configured to prevent access to the one or more parking lot adapters.

In another embodiment, a method of securing fiber optic connections using the disclosed locking apparatus is also disclosed. The method includes providing a locking plate comprising at least one cut-out area and at least one finger portion. The method further comprises positioning the locking plate in a selected position such that when a fiber optic connector on an end of a fiber optic cable is connected to at least one fiber optic connector, the fiber optic cable is allowed to pass through the cut-out area of the locking plate but the fiber optic connector is not allowed to pass through the cut-out area of the locking plate. A lock is provided on the locking plate to keep the locking plate in a selected position.

Storing the unused or unconnected optical fibers in lockable parking lot compartments may help solve the potential problem of parking unused or unconnected optical fibers in a simple panel inside the fiber optic terminal that houses the optical splitter, which may allow unauthorized users to "tap" into the network.

Figure 7:
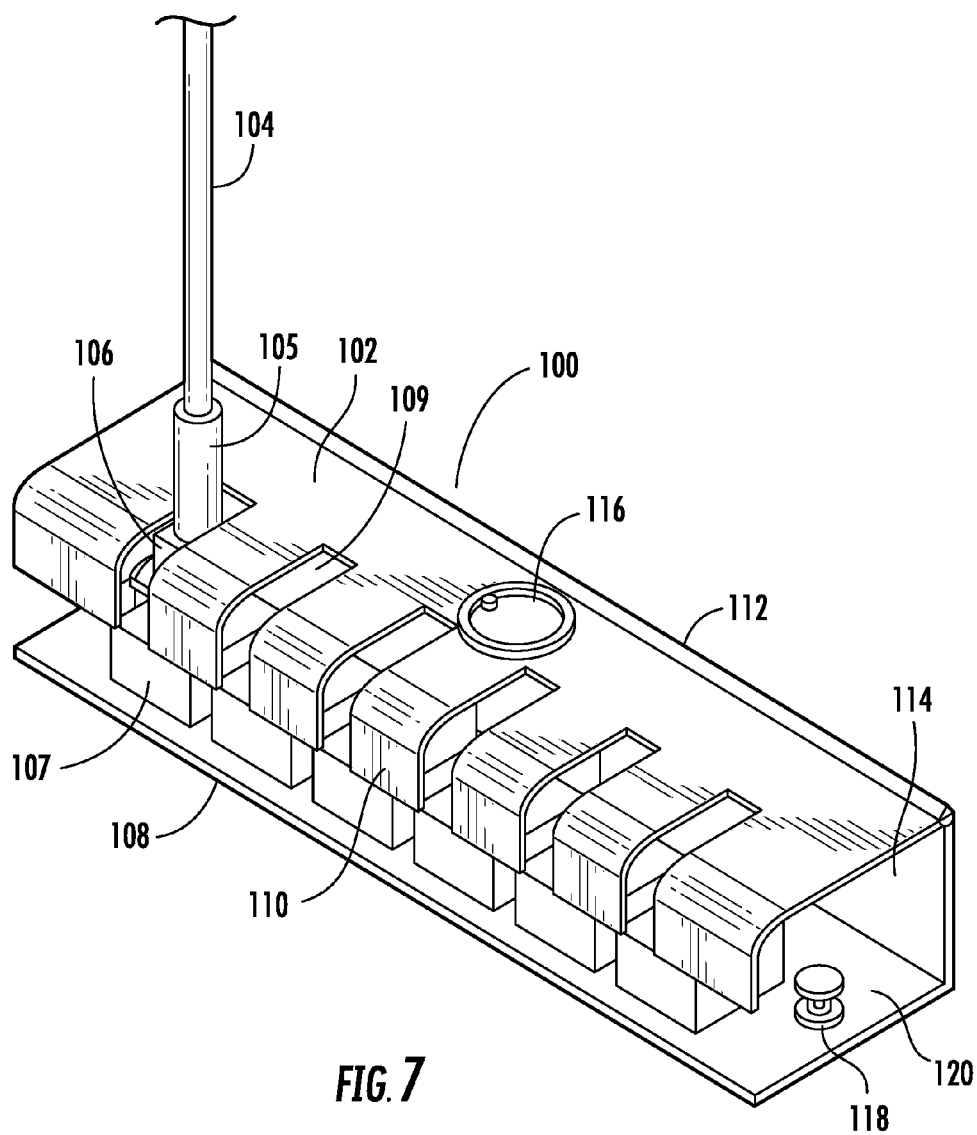
FIG. 7 illustrates an exemplary locking mechanism according to one embodiment.

Before describing exemplary locking methods and apparatuses including lockable parking lot compartments in greater detail starting at FIG. 7, a discussion is provided of an exemplary fiber optic network comprising exemplary fiber optic terminals in which the disclosed locking mechanism and lockable parking lot compartments may be located.

Figure 2:
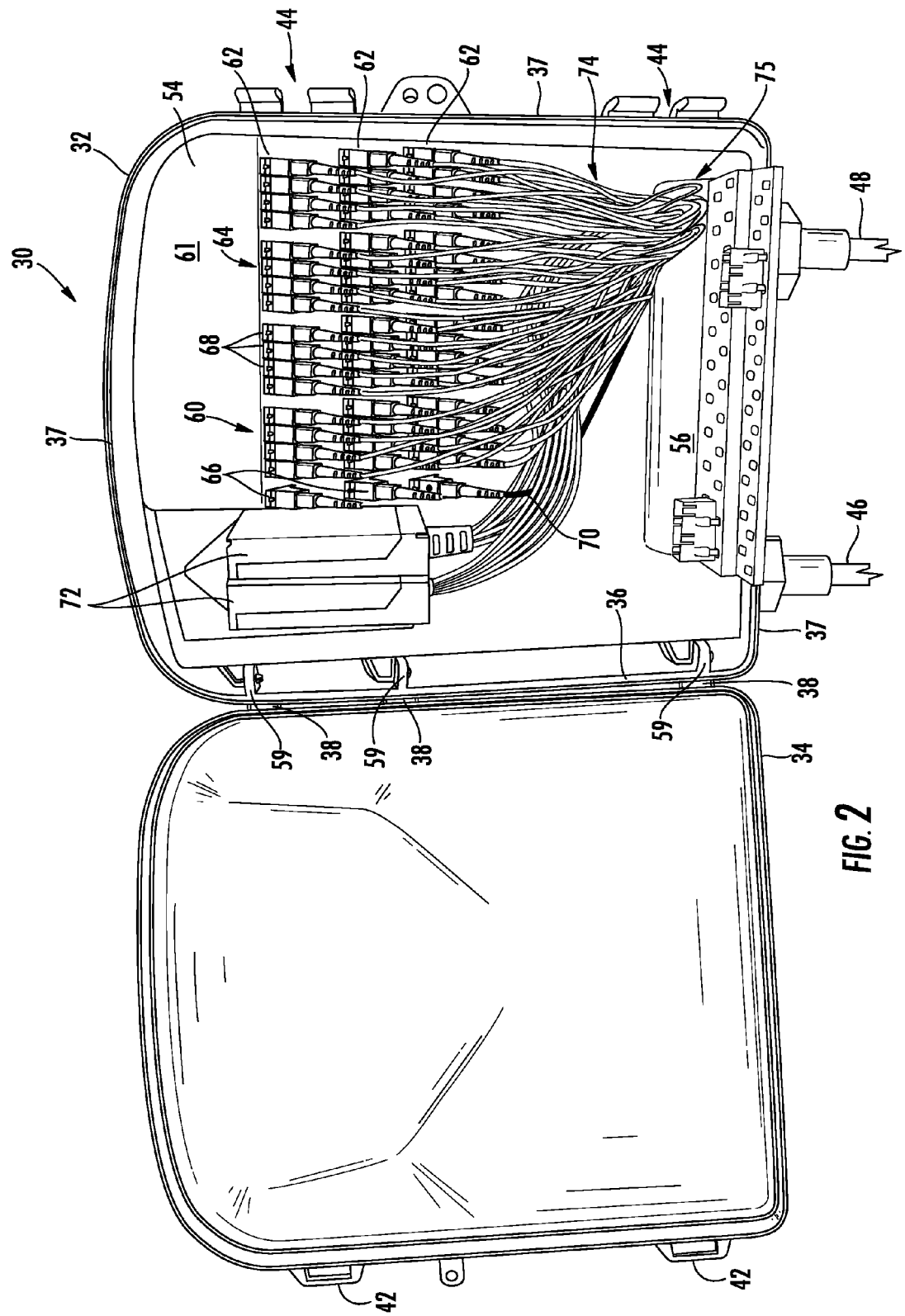
FIG. 2 is an exemplary fiber optic terminal with established optical fiber connections according to one embodiment.

Referring to FIG. 2, a fiber optic terminal 30 constructed in accordance with one embodiment is shown. The fiber optic terminal 30 provides a convenient access point in a telecommunications or data network for a field technician to install and reconfigure optical fiber connections between network-side and subscriber-side fiber optic cables. The fiber optic terminal 30 is configured to allow one or more optical fibers provided in one or more network-side or upstream fiber optic cables to be easily and readily interconnected with one or more optical fibers in one or more subscriber-side or downstream fiber optic cables. By the term "subscriber-side," it is meant that optical fiber, fiber optic cable, or optical connection, as the case may be, is provided anywhere between the end subscriber and the fiber optic terminal 30. A subscriber-side fiber optic cable, optical fiber, or optical connection may be provided directly to an end subscriber or may be provided to one or more intermediate optical terminals or components before reaching an end subscriber. By the term "network-side," it is meant that the optical fiber, fiber optic cable, or optical connection, as the case may be, is provided between a fiber optic network, central switching point, central office, or the like and the fiber optic terminal 30.

Figure 3:
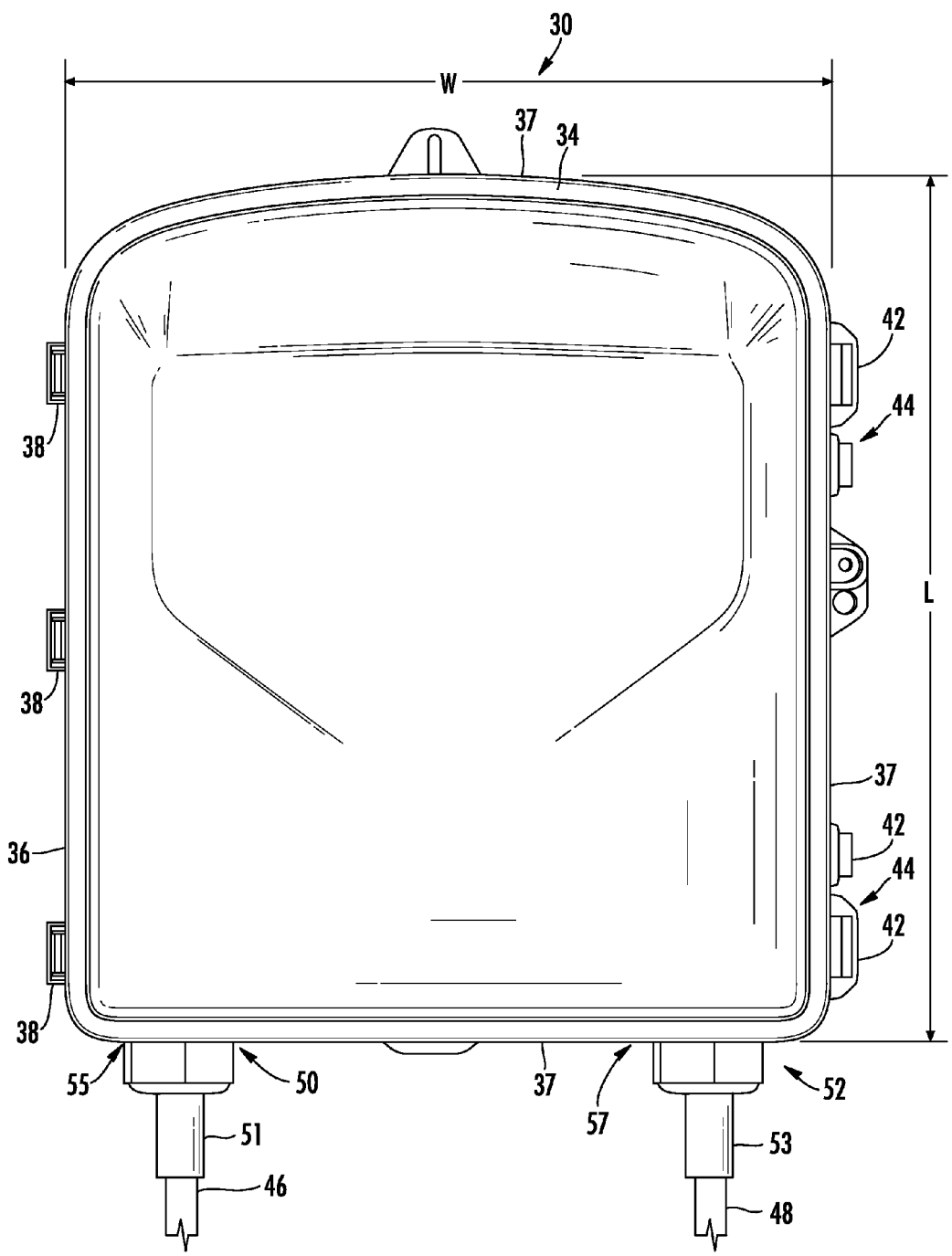
FIG. 3 illustrates the fiber optic terminal of FIG. 2 with a cover closed on a base of the fiber optic terminal.

The fiber optic terminal 30 illustrated in FIG. 2 comprises a base 32 and a cover 34 hingedly affixed to the base 32 and opened thereon. The base 32 and cover 34 may be made of a rigid material, such as aluminum, plastic, or thermoplastic, such that the internal components of the fiber optic terminal 30 can be protected when the cover 34 is closed on the base 32, as illustrated in FIG. 3. Turning back to FIG. 2, the cover 34 is generally rectangular and is hingedly affixed to the base 32 of similar form along the upper edge of a left side wall 36 at one or more hinge locations 38. The base 32 is comprised of three other side walls 37 that are either attached or interconnected to each other and the left side wall 36 to form an interior cavity 40 within the base 32 (see FIG. 4). The interior cavity 40 provides room for routing the network-side and subscriber-side cables and the optical fibers therein and making optical interconnections between the two, including through any intermediate optical components that may be provided in the fiber optic terminal 30, such as splice trays, coupler trays, and adapters as examples, as will be described in more detail below.

A technician opens the cover 34 to access the interior cavity 40 to install or reconfigure optical interconnections within the fiber optic terminal 30. After completion, the cover 34 can be closed against the base 32 to close the fiber optic terminal 30. The cover 34 and the base 32 contain one or more clasps 42, 44 that interlock with each other when the cover 34 is closed on the base 32 as a means of securing the cover 34 to the base 32. When the cover 34 is closed, the optical interconnections and components contained inside the fiber optic terminal 30 are protected from the environment.

As will be discussed in more detail herein, the fiber optic terminal 30 and its internal components facilitate making optical connections between optical fiber(s) provided by a network-side cable 46 and a subscriber-side cable 48. Both may be distribution cables. The fiber optic terminal 30 may be particularly suited for high volume/density optical connections. The network-side cable 46 provides one or more optical fibers configured to be optically connected to a fiber optic network for carrying optical signals to and from the fiber optic network. The subscriber-side cable 48 also contains one or more optical fibers, but the one or more optical fibers are configured to be run towards the end subscribers either directly, or through one or more intermediate terminals and/or other optical components. Thus, when an optical fiber(s) provided in the network-side cable 46 is optically connected to an optical fiber(s) provided in the subscriber-side cable 48, an optical connection can be established between an end subscriber and a fiber optic network.

Figure 4:
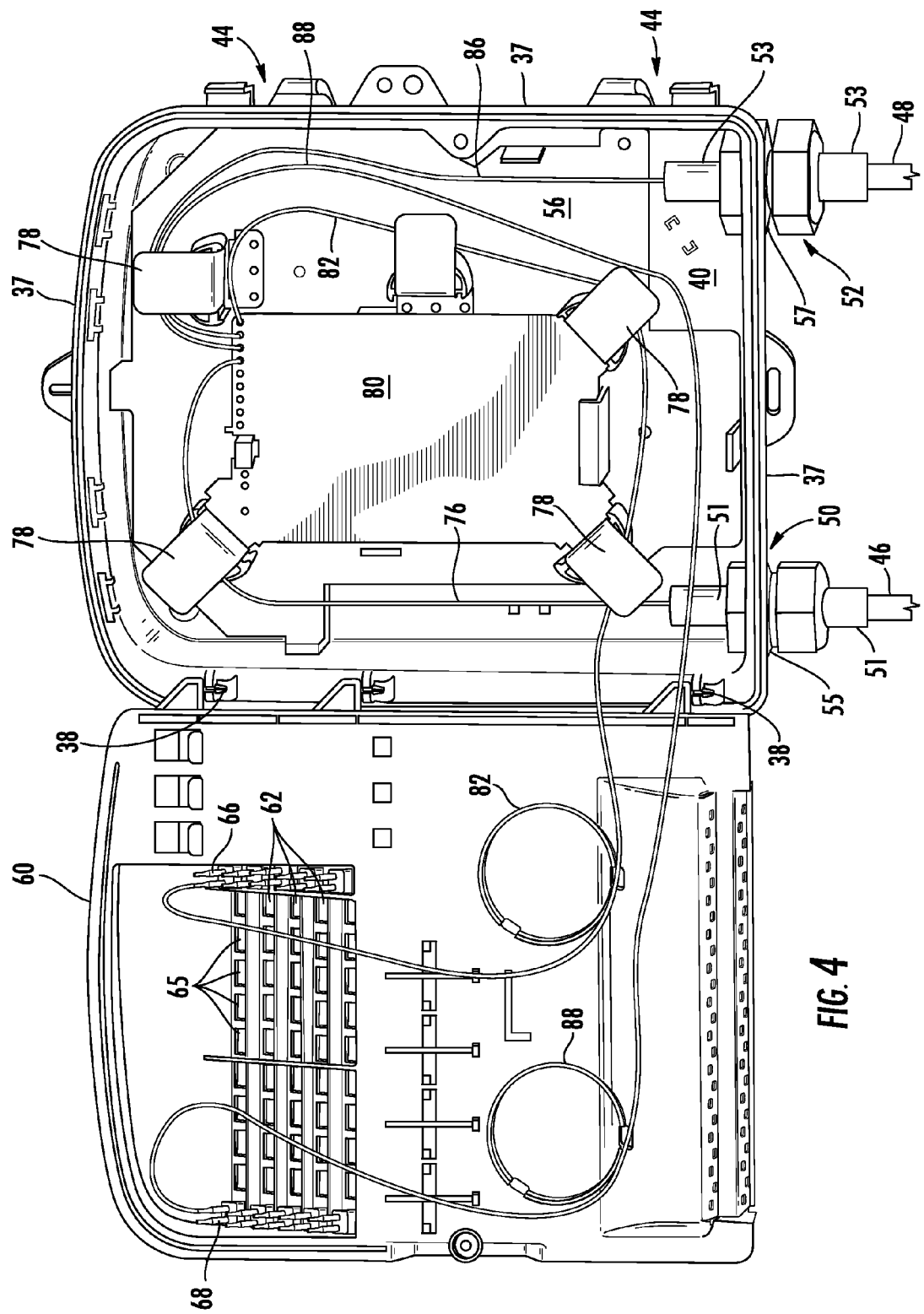
FIG. 4 illustrates the fiber optic terminal of FIG. 2 with a transition panel opened with a lower fiber management area of the fiber optic terminal exposed.
Figure 6:
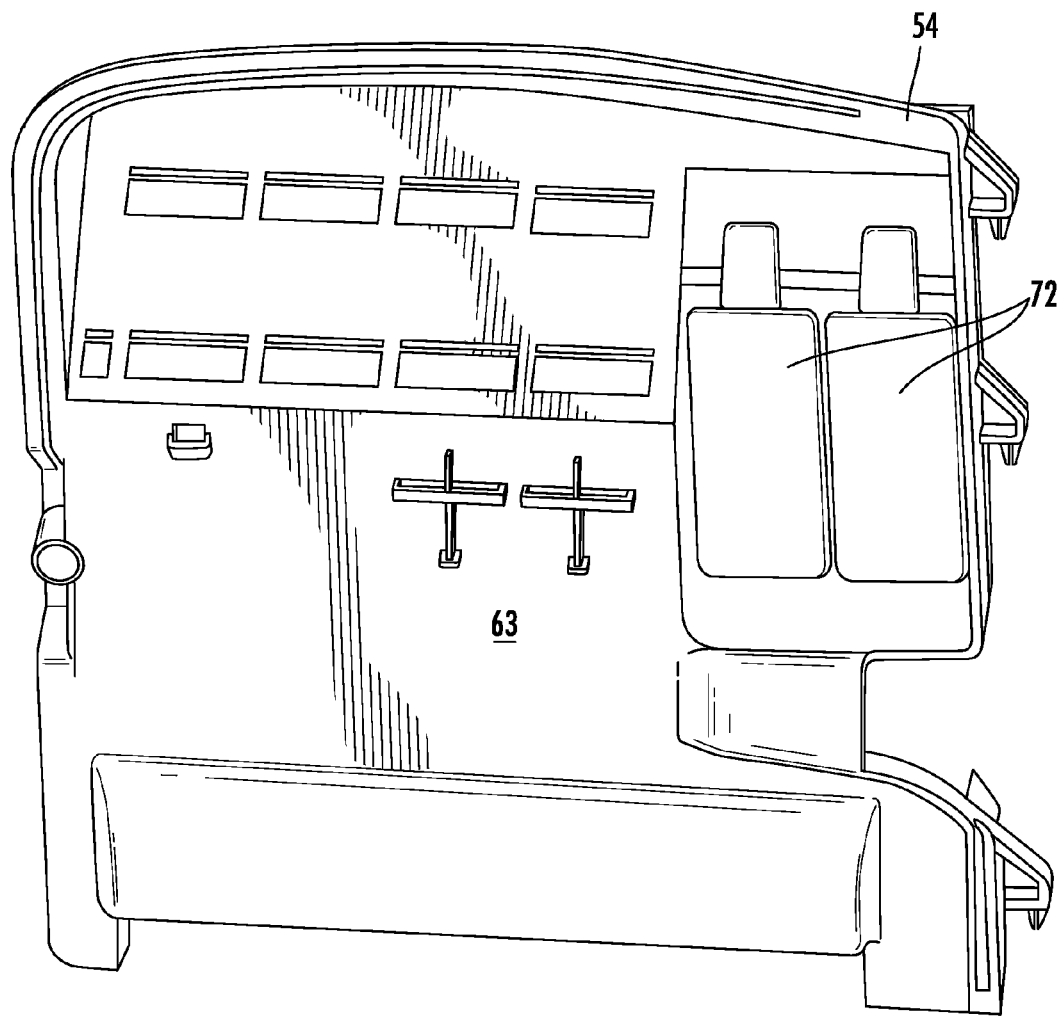
FIG. 6 illustrates another alternative embodiment of a transition panel for the fiber optic terminal of FIG. 2 having one or more optical fiber splitters located on the rear side of the transition panel.

As illustrated in FIGS. 2 and 4, the network-side cable 46 and the subscriber-side cable 48 enter the fiber optic terminal 30 via respective cable port assemblies 50, 52 provided in the base 32. Each cable port assembly 50, 52 is comprised of sleeves 51, 53 coupled to ports 55, 57 provided in the base 32 and configured to receive the network-side cable 46 and the subscriber-side cable 48, respectively. The sleeves 51, 53 may provide strain relief to the network-side cable 46 and the subscriber-side cable 48. Although only one network-side cable 46 and one subscriber-side cable 48 are illustrated, note that the fiber optic terminal 30 could be provided with multiple ports to accept and provide optical connections between multiple network-side cables 46 and/or subscriber-side cables 48. The cable port assemblies 50, 52 in the fiber optic terminal 30 facilitate receipt and routing of the network-side cable 46 and the subscriber-side cable 48 behind a transition panel 54 disposed within the interior cavity 40. The transition panel 54 is comprised of a front side 61 (FIG. 2) and a rear side 63 (FIG. 6).

Although the transition panel 54 is illustrated in the stowed position in FIG. 2, the transition panel 54 may be rotatable relative to the base 32 through an angle of approximately one hundred and ten (110) degrees between the stowed position and the deployed position, although any degree of rotation can be provided. The transition panel 54 is generally rectangular and is hingedly affixed to the base 32 along the edge of the left side wall 36 at one or more hinge locations 59 as shown in FIG. 2. The hinge locations 59 may be located on the same left side wall 36 as the one or more hinge locations 38 that hingedly affix the cover 34 to the base 32 in this embodiment. However, the hinge locations 59 may be located on the opposite side wall 37 as the hinge locations 38. Alternatively, the transition panel 54 may be slidably attached to the base 32 to selectively expose portions of the interior cavity 40 of the base 32, or may be removably attached to the base 32 to provide unobstructed access to the interior cavity 40. Any configuration is possible as long as there is sufficient space provided in the upper area of the fiber optic terminal 30 to route the optical fibers of the network-side cable 46 and the subscriber-side cable 48 between the cable port assemblies 50, 52 and the transition panel 54. Although not shown, the base 32 and/or the transition panel 54 may be provided with conventional means for securing the transition panel 54 to the base 32 in the closed configuration. Furthermore, the base 32 and/or transition panel 54 may be provided with conventional means for retaining the transition panel 54 in the opened configuration. If necessary, the transition panel 54 may also be provided with lengthwise and/or widthwise stiffening ribs to strengthen and prevent distortion of the transition panel 54.

In this embodiment of the fiber optic terminal 30, the cable port assemblies 50, 52 are provided in the base 32 such that the network-side cable 46 and the subscriber-side cable 48 are routed into a lower fiber management area 56. The transition panel 54 is movable relative to the base 32 to expose the lower fiber management area 56 to a field technician initially installing the fiber optic terminal 30 or subsequently reconfiguring the optical fiber connections within the fiber optic terminal 30. There, the cable jackets of the network-side cable 46 and the subscriber-side cable 48 can be stripped away to expose the one or more optical fibers carried therein for preparing optical interconnections within the fiber optic terminal 30. Optical interconnections may include splicing the optical fibers carried in the network-side cable 46 and subscriber-side cable 48 as will be discussed below in more detail.

As will be described herein, eventually, one or more optical fibers from the network-side cable 46 and one or more optical fibers from the subscriber-side cable 48 are optically connected to each other via an adapter module 60. The adapter module may contain or support one or more fiber optic adapters. The adapter module 60 may be integrally formed as part of a mold of a transition panel or provided as a separate module which may be attached to a transition panel. More than one adapter module 60 may be provided, but the fiber optic terminal 30 illustrated in FIG. 2 contains one (1) adapter module 60. The adapter module 60 contains one or more adapter panels 62. An adapter panel is a panel that is configured to support a plurality of fiber optic adapters 64. The fiber optic adapters 64 support making optical connections between one or more optical fibers from the network-side cable 46 and one or more optical fibers from the subscriber-side cable 48. In this embodiment, each adapter panel 62 contains at least one (1) input fiber optic adapter 66 and at least one (1) output fiber optic adapter 68. In the fiber optic terminal 30 of FIG. 2, one (1) input fiber optic adapter 66 and sixteen (16) output fiber optic adapters 68 are illustrated as being supported by each adapter panel 62. Behind the transition panel 54 in the lower fiber management area 56, as will be described in more detail below, one or more fibers from the network-side cable 46 will be exposed, spliced, and optically connected to one or more input fiber optic adapters 66. One or more fibers from the subscriber-side cable 48 will also be exposed, spliced, and optically connected to one or more output fiber optic adapters 68. One fiber can be connected to each fiber optic adapter 66, 68 provided in the adapter module 60.

To make an optical connection between one or more network fibers from the network-side cable 46 and one or more fibers from the subscriber-side cable 38, an input fiber 70 is provided that is connectorized on one end and connected to an input fiber optic adapter 66 to optically connect the input fiber 70 to a fiber provided by the network-side cable 46. As seen below in FIG. 5, the other end of the input fiber 70 is input into an optical splitter 72. The optical splitter 72 is configured to split optical signals carried by the input fiber 70, via connection to the input fiber optic adapter 66, into a plurality of optical signals carried by connectorized output fibers 74. One or more of the output fibers 74 can then be connected into one or more of the output fiber optic adapters 68 to optically connect optical fibers in the subscriber-side cable 48 to optical fibers in the network-side cable 46. The adapter panels 62 are configured to provide both input and output fiber optic adapters 66, 68 on the same panel to facilitate ease in initially installing or reconfiguring optical connections. Further, any fiber optic adapter and number of same can be configured as either input or output fiber optic adapters 66, 68 to provide flexibility when installing or reconfiguring optical connections. A fiber parking area 75 provides room for the output fibers 74 to be located or parked when not connected to the output fiber optic adapters 68 and optical splitter(s) 72, if provided.

The fiber optic adapters 66, 68 are LC adapters in the embodiment of FIG. 2, but may be of any connection type, including but not limited to SC, LC, MTP, FC, ST, MU, or MTRJ. Also, as illustrated in FIG. 2, the fiber optic terminal 30 is configured for forty-eight (48) subscribers, whereby several input fibers may be split into sixteen (16) fibers. Three (3) optical splitters 72 are provided in this regard in the fiber optic terminal 30, since each optical splitter 72 provided therein can optically split optical signals carried by the input fiber 70 into sixteen (16) output fibers. Note, however, that any splitting configuration is possible to be provided by the fiber optic terminal 30, including providing one or more than three (3) optical splitters 72. Other splitter configuration examples include, without limitation, 1×32, 1×16 and 1×8. The splitter configuration depends on factors such as the number of network-side cables 46, the number of subscriber-side cables 48, the available space in the upper area of the fiber optic terminal 30, and the connector type for the fiber optic adapters 66, 68. For example, for SC connector types, the fiber optic terminal 30 may accommodate one (1) 1×32 optical splitter for a total of thirty-two (32) output fibers 74, three (3) 1×16 optical splitters or six (6) 1×8 optical splitters for a total of forty-eight (48) output fibers 74. LC connector types may accommodate three (3) 1×32 optical splitters, six (6) 1×16 optical splitters, or twelve (12) 1×8 optical splitters for a total of ninety-six (96) output fibers 74.

FIG. 2 illustrates the fiber optic terminal 30 with exemplary finalized optical connections made on the adapter module 60. The components and aspects of the fiber optic terminal 30 to route optical fibers from the network-side cable 46 and the subscriber-side cable 48 to optically connect optical fibers provided therein to the input and output fiber optic adapters 66, 68, respectively, will now be described. FIG. 4 illustrates the fiber optic terminal 30 of FIG. 2 with the transition panel 54 opened showing the lower fiber management area 56 to show exemplary routing and connections that may be provided for optical fiber(s) from the network-side cable 46 and the subscriber-side cable 48 to the fiber optic adapters 66, 68. As previously discussed and illustrated in FIG. 2, providing optical fiber(s) from the network-side cable 46 and the subscriber-side cable 48 to the fiber optic adapters 66, 68 on the adapter panel(s) 62 facilitates making optical connections in the upper area of the fiber optic terminal 30, as previously discussed and illustrated in FIG. 2.

In order to assist or prevent a technician from incorrectly installing an input fiber 70 into an output fiber optic adapter 68, and/or an output fiber 74 into an input fiber optic adapter 66, the input fiber 70 and/or output fibers 74 from the optical splitter 72 in the fiber optic terminal 10 may be marked. Such may be marked by cable jackets or sleeves of different colors or other visual markings, such as lines, symbols, etc. For example, as illustrated in FIG. 2, the input fiber 70 is marked by being solid, which could be indicative of any type of marking, coloring, or other visual indicator. Also, as illustrated in FIG. 2, the input fiber optic adapter 66 can also be marked in lieu of or in addition to marking of the input fiber 70. The marking on the input fiber optic adapter 66 is illustrated as a dot, but can be any other type of marking. Other or similar marking may also be provided on the output fibers 74 and/or the output fiber optic adapters 68 in the same or similar regard to allow a technician to distinguish input fibers 70 from output fibers 74 and/or input fiber optic adapters 66 from output fiber optic adapters 68. Further, the fiber optic adapters 66, 68 may be shuttered, or the fiber optic adapters 66, 68 may be keyed with a corresponding matching key provided on the input fiber 70 and/or the output fibers 74 to prevent an input fiber 70 from being connected to an output fiber optic adapter 68 and/or an output fiber 74 from being connected into an input fiber optic adapter 66.

As illustrated in FIG. 4, the transition panel 54 contains one or more openings 65 to support one or more fiber optic adapters 66, 68 as part of the adapter module 60 for supporting optical connections as previously described. One or more network-side fibers 76 are provided in the lower fiber management area 56 in this example. The network-side fiber(s) 76 is an optical fiber from the network-side cable 46. The network-side cable 46 is not shown coming into the lower fiber management area 56, but will typically be done when the fiber optic terminal 30 is installed. A technician will typically strip the cable jacket around the network-side cable 46 run inside the base 32 and into the lower fiber management area 56 to expose the one or more network-side fibers 76. The network-side fiber(s) 76 can be routed through the lower fiber management area 56 through one or more fiber routing guides 78. The fiber routing guides 78 can route the network-side fiber(s) 76 and/or provide for slack storage of the network-side fiber(s) 76 if needed. The network-side fiber(s) 76 can then connect to a conventional splice tray 80. Inside the splice tray 80, one or more network-side splices and/or splice holders are provided to splice the network-side optical fiber(s) 76 into one or more input pigtails 82 for each network-side optical fiber 76 in any known manner. Such includes fusion or mechanical splicing. For purposes of clarity, only a representative one of the network-side fibers 76 existing in the splice tray 80 and terminating into an input pigtail 82 is described herein. However, it will be readily apparent and well understood by one of ordinary skill in the art that other network-side fibers, if provided, can be spliced into input pigtails and routed in substantially the same manner.

Upon exiting the splice tray 80, the input pigtail 82 can be routed around one or more fiber routing guides 78 to the underside of the transition panel 54 to an input fiber optic adapter 66 provided in an adapter panel 62. In this manner, the input pigtail 82 is optically connected to an input fiber optic adapter 66 so as to be accessible in the upper area of the fiber optic terminal 30 for a technician to establish optical connections to the network-side fiber(s) 76 without having to open the transition panel 54 and expose the lower fiber management area 56, if desired.

With continued reference to FIG. 4, one or more subscriber-side fibers 86 are provided in the lower fiber management area 56. The subscriber-side fiber(s) 86 is an optical fiber from the subscriber-side cable 48. A technician will typically strip the cable jacket around the subscriber-side cable 48 run inside the base 32 and into the lower fiber management area 56 to expose the one or more subscriber-side fibers 86. The subscriber-side fiber(s) 86 can also be routed through the lower fiber management area 56 through the one or more fiber routing guides 78. The fiber routing guides 78 can route the subscriber-side fiber(s) 86 and/or provide for slack storage of the subscriber-side fiber(s) 86 if needed. The subscriber-side fiber(s) 86 are then optically connected to the splice tray 80. Inside the splice tray 80, one or more subscriber-side splices and/or splice holders are provided to splice the subscriber-side fiber(s) 86 into one or more output pigtails 88 for each subscriber-side fiber 86 in any known manner. Such includes fusion or mechanical splicing. For purposes of clarity, only a representative one of the subscriber-side fibers 86 routed to the splice tray 80 and spliced to an output pigtail 88 is described herein. However, it will be readily apparent and well understood by one of ordinary skill in the art that other subscriber-side fibers, if provided, can be spliced into output pigtails and routed in substantially the same manner.

Upon exiting the splice tray 80, the output pigtail 88 can be routed around one or more of the fiber routing guides 78 to the underside of the transition panel 54 to an output fiber optic adapter 68. In this manner, the output pigtail 88 is optically connected to an output fiber optic adapter 68 accessible in the upper area of the fiber optic terminal 30 for a technician to establish optical connections to the subscriber-side fiber(s) 76 without having to open the transition panel 54 and expose the lower fiber management area 56, if desired.

At this point, one or more network-side fibers 76 from the network-side cable 46 and one or more subscriber-side fibers 86 from the subscriber-side cable 48 have been received, routed, spliced into input and output pigtail(s) 82, 88, respectively, and connected to fiber optic adapter(s) 84 located in the back side of the transition panel 54 on the same adapter panel 62. When these connections are finalized, a technician can close the transition panel 54 to close off the lower fiber management area 56 and make any optical connections desired in the upper area of the fiber optic terminal 30 via optical connections using a jumper or input and output fibers 70, 74 between the input and output fiber optic adapters 66, 68, respectively, as previously discussed.

Figure 5:
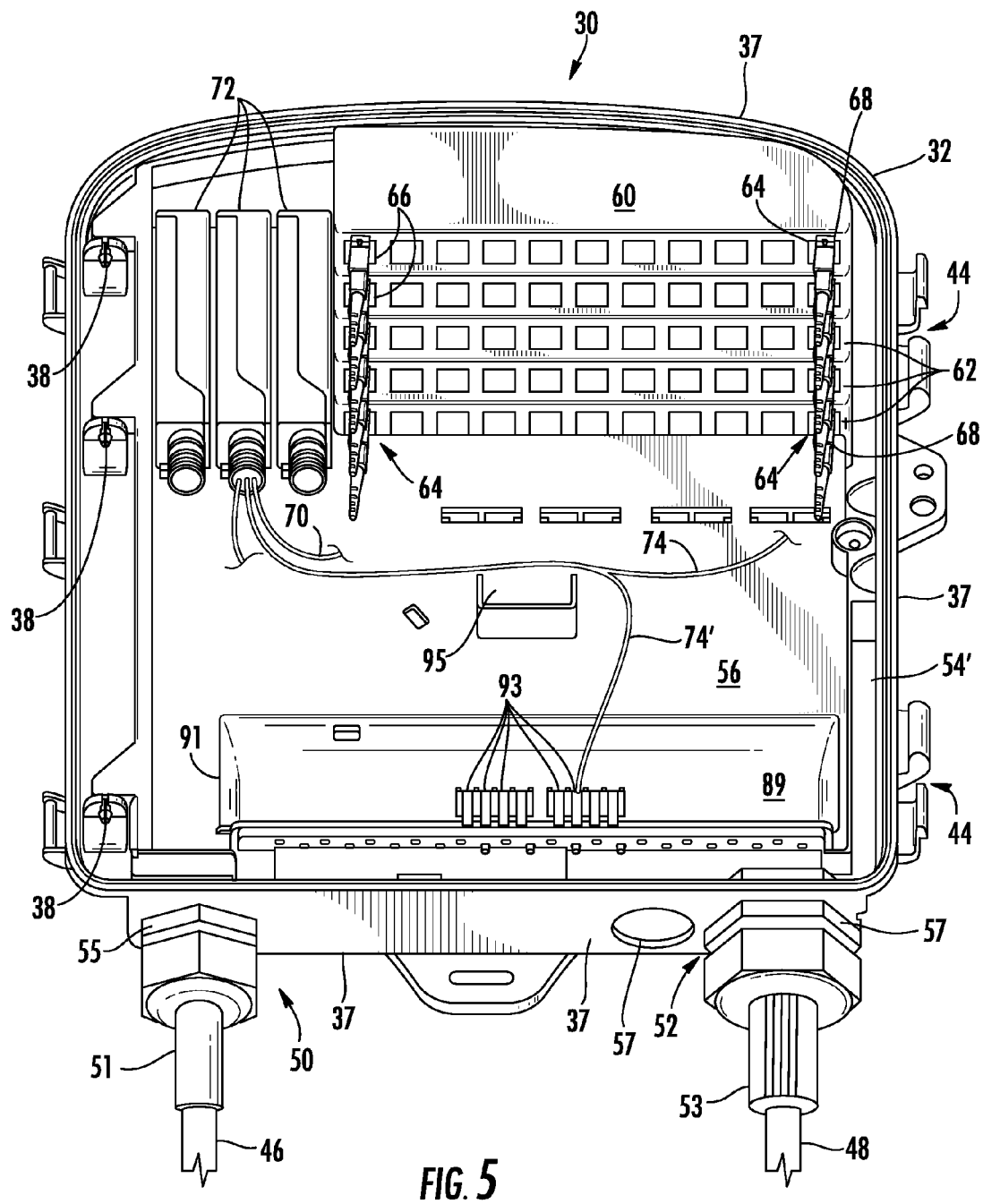
FIG. 5 illustrates an alternative embodiment of a transition panel for the fiber optic terminal of FIG. 2 providing an optical fiber parking area.

Variations of the fiber optic terminal 30 and its components are possible. As an example, FIG. 5 illustrates the fiber optic terminal 30 of FIG. 2, but having an optical fiber parking area 89 for unconnected output fibers 74. The optical fiber parking area 89 may be comprised of a protruding portion 91 molded into a transition panel 54' that contains one or more orifices 93. A parked output fiber 74' can be inserted into an orifice 93 extending through the transition panel 54' into the lower fiber management area 56. If an optical splitter 72 is employed in the fiber optic terminal 30, output fibers 74 for each optical split will typically be provided from the optical splitter 72 even if not connected to output fiber adapters 68 on the adapter module 60. This scenario would exist when an optical fiber is run to an end subscriber, but the subscriber's optical fiber has not yet been connected. In such case, it may be desirable to "park" any unconnected output fibers 74' to prevent them from being damaged when installing or reconfiguring other input and/or output fibers 70, 74. In this regard, as illustrated in FIG. 5, an unconnected output fiber 74' from one or more of the optical splitters 72 may be parked in the optical fiber parking area 89. An optional fiber support 95 may also be provided as part of the transition panel 54' to guide parked optical fibers to prevent them from dropping to the bottom of the transition panel 54' and incurring sharp bending.

As an example of another variation, the optical splitters 72 do not have to be provided in any particular area. FIG. 6 illustrates a transition panel 54 where two optical splitters 72 provided on the rear side 63 of the transition panel 54 such that the optical splitters 72 are contained in the lower fiber management area 56 when the transition panel 54 is closed on the base 32. Although not limiting, providing optical splitters 72 on the rear side 63 of the transition panel 54 may be well-suited when using input and output fibers 70, 74 that are smaller in diameter, such as 900 micrometers (µm) for example. Space limitations in the lower fiber management area 56 and routing limitations between the rear side 63 and front side 61 of the transition panel 54 could be factors affecting providing optical splitters 72 on the rear side 63 of the transition panel 54.

The fiber optic terminal 30 may be installed in any location or premises. The fiber optic terminal 30 described herein may be particularly suited for multi-dwelling units (MDUs), because the fiber optic terminal 30 is capable of providing high density optical connections between a network-side cable(s) and a subscriber-side cable. Further, the fiber optic terminal 30 may be configured as either an LCP or an FDT.

The fiber optic terminal 30 may be installed in any location, including an aerial location, buried, or disposed in a larger enclosure, such as a ground pedestal. The network-side and subscriber-side cables 46, 48 may be any type of fiber optic cable and include any type of optical fibers in any form. The term "optical fibers" as used herein is intended to include all types of optical fibers, including but not limited to loose buffered optical fibers, and in any form, including but not limited to a multi-fiber ribbon, individual optical fibers, or any other known expedient of a fiber optic cable. Additionally, the optical fibers may have various diameters, including for example only, diameters of 900 nm, 2 millimeters (mm) and 3 mm.

There may be a number of fiber optic adapter panels and/or modules in the fiber optic terminals disclosed above in FIGS. 2-6. Given the number of optical interconnections in these fiber optic terminals, one concern is that improper connections or disconnections of fiber optic cables to the fiber optic adapter panels or modules may occur. There may be little to no control over physical access such that anyone with access to the LCPs or FDTs or other locations where a fiber optic cable is terminated has the ability to change the configuration of the fiber optic cables. The improper connections or disconnections may be inadvertent or malicious. Inadvertent connections or disconnections can cause network downtime. Malicious connections or disconnections can facilitate traffic filtering, sniffing, or mirroring, and is a security risk. Thus, there is a need to be able to secure fiber optic connectors to a fiber optic adapter panel and/or lock the fiber optic connectors out of a fiber optic adapter panel or module.

In addition, Passive Optical Network (PON) technology has been developed for FTTH applications in access networks. Where PON technology is implemented in premises cabling for fiber-to-the-desk (FTTD) applications in local area networks (LANs), special security requirements may be necessary because the LANs could be used in military, government or high-security research areas. Due to the nature of the PON system, all signals are available on all ports at the end-user side of the optical splitter. This represents a security risk if not all ports are used or connected. Thus, there is also a need to secure the unused ports on the end-user side of the optical splitter in these PON systems.

FIG. 7 illustrates an exemplary locking mechanism 100 configured to secure a fiber optic adapter panel, a fiber optic module, or fiber optic connections according to one embodiment. The locking mechanism 100 includes a locking plate 102. The locking plate 102 may be made of a rigid material, such as a metal (including, but not limited to aluminum), plastic, or thermoplastic. In FIG. 7, a fiber optic cable 104 having a boot 105 is connected to a fiber optic connector 106, which is connected to a fiber optic adapter 107 disposed on a fiber optic adapter panel 108 in typical fashion. The fiber optic adapter panel 108 may comprise a plurality of fiber optic adapters 107. The fiber optic cable 104 may comprise at least one optical fiber. In one embodiment, there may be a plurality of fiber optic cables 104 that may be connected to the plurality of fiber optic adapters 107 by means of a plurality of fiber optic connectors 106 disposed on an end of each of the fiber optic cables 104. The locking plate 102 may comprise cut-out areas 109 and finger portions 110 in one embodiment.

In the embodiment of FIG. 7, the locking plate 102 may be affixed to the fiber optic adapter panel 108. In another embodiment, the locking plate 102 may be affixed to the transition panel 54 of FIG. 2. In the embodiment of FIG. 7, the locking plate 102 is hingedly affixed by way of a hinge 112 to an extension plate 114, which is affixed to the fiber optic adapter panel 108. The extension plate 114 may be made of a rigid material, such as a metal (including, but not limited to aluminum), plastic, or thermoplastic. The locking plate 102 and/or the extension plate 114 may be formed at the same time as the fiber optic adapter panel 108 as a unitary piece in one embodiment. In another embodiment, the extension plate 114 may be attached to the fiber optic adapter panel 108 via a welding process. The extension plate 114 may be attached at an angle to the fiber optic adapter panel 108. In one embodiment, this angle may be at or about ninety (90) degrees. The extension plate 114 may be attached to either the right or left edge of the fiber optic adapter panel 108.

The hinge 112 on the extension plate 114 allows the locking plate 102 to be adjustably positioned to a selected position (such as the position shown in FIG. 7). In one embodiment, the locking plate 102 may be rotated around the hinge 112 to adjustably position the locking plate 102 into the selected position. In one embodiment, the selected position places the locking plate 102 over the fiber optic connectors 106, which are connected to the fiber optic adapters 107 on the fiber optic adapter panel 108, such that the fiber optic connectors 106 and the fiber optic adapters 107 are covered by the locking plate 102. In the selected position, a technician or other person would not have access to the connection between the fiber optic connectors 106 and the fiber optic adapters 107.

The cut-out areas 109 and the finger portions 110 in the locking plate 102 are configured to allow the fiber optic cable 104 (and associated boot 105, if present) to pass through the cut-out area 109 of the locking plate 102 when the locking plate 102 is in the selected position. However, when the locking plate 102 is in the selected position, the finger portion 110 of the locking plate 102 does not allow the fiber optic connector 106 to pass through the cut-out area 109. The size and shape of the cut-out areas 109 and the finger portions 110 may vary, and any size or shape that allows the fiber optic cable 104 (and any associated boot 105) to pass through the cut-out area 109, but prevents the fiber optic connector 106 from passing through the cut-out area 109 of the locking plate 102, is acceptable. When the locking plate 102 has been rotated over the fiber optic connectors 106 and the fiber optic adapters 107 in order to adjustably position the locking plate 102 into the selected position, the fiber optic connectors 106 that are inserted into the fiber optic adapters 107 are held into place, preventing removal of the fiber optic connectors 106. Likewise, when the locking plate 102 is in the selected position such that it covers the fiber optic connectors 106 and the fiber optic adapters 107, the insertion of any additional fiber optic connectors 106 into unused fiber optic adapters 107 is prevented.

Once the locking plate 102 has been rotated over the fiber optic connectors 106 and the fiber optic adapters 107 in order to adjustably position the locking plate 102 into the selected position, the locking plate 102 may be kept in place by using a lock 116. The lock 116 may be any lock that prevents the locking plate 102 from being opened when it has been rotated over the fiber optic connectors 106 and the fiber optic adapters 107 in order to adjustably position the locking plate 102 into the selected position. The lock 116 may have its own unique key such that the lock 116 is individually keyed for per-panel security. In this manner, each fiber optic adapter panel 108 would require its own key. In the alternative, a standard key may be used for all fiber optic adapter panels in a particular fiber optic terminal or space. An adapter plunger 118 may be disposed on the base 120 of the fiber optic adapter panel 108. The adapter plunger 118 is configured to be selectively actuated to allow removal of the entire fiber optic adapter panel 108 from a housing in which it is located.

Figure 8:
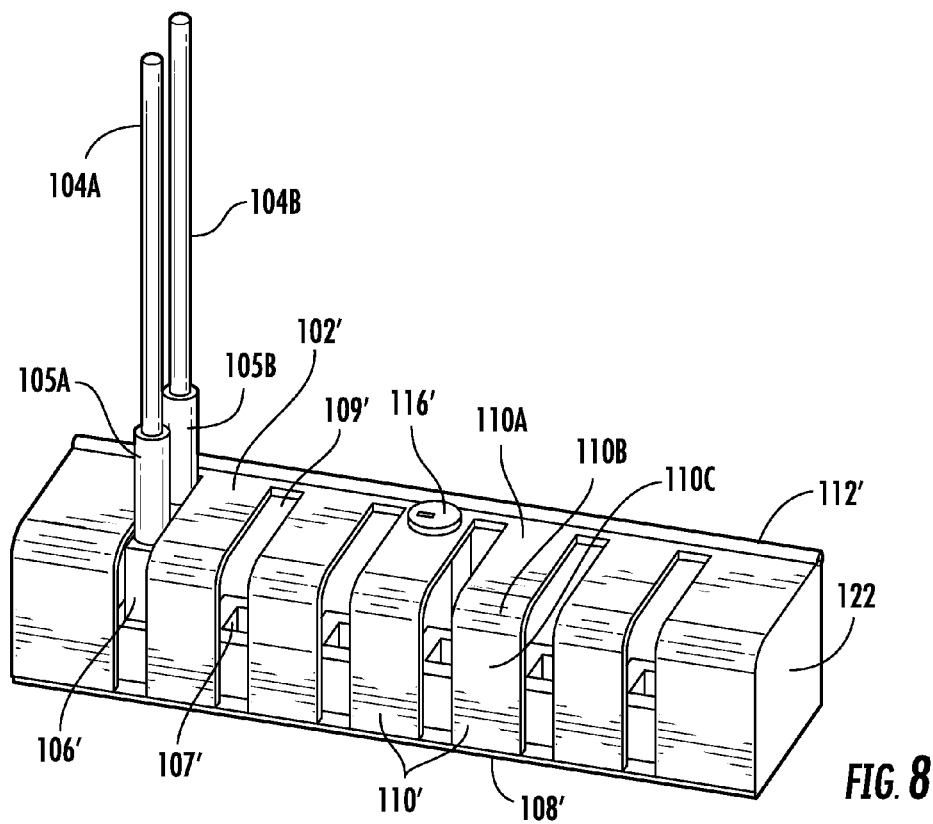
FIG. 8 illustrates another exemplary locking mechanism according to one embodiment.

FIG. 8 illustrates an alternate exemplary locking mechanism according to one embodiment. In particular, FIG. 8 illustrates a duplex fiber optic adapter panel 108'. In FIG. 8, two fiber optic cables 104A and 104B having respective boots 105A and 105B are connected to a fiber optic connector 106', which is connected to one or more fiber optic adapters 107' disposed on a fiber optic adapter panel 108'. Each of the fiber optic cables 104A and 104B may contain at least one optical fiber. As in the embodiment illustrated in FIG. 7, the locking plate 102' may be attached to the fiber optic adapter panel 108'. The fiber optic adapter panel 108' may comprise a plurality of fiber optic adapters 107'. In one embodiment, there may be a plurality of fiber optic cables 104 that may be connected to the plurality of fiber optic adapters 107' by means of a plurality of fiber optic connectors 106' disposed on an end of each of the fiber optic cables 104'. In one embodiment, the locking plate 102' is hingedly affixed by way of a hinge 112' to an extension plate (not shown in FIG. 8), which is affixed to the fiber optic adapter panel 108'.

The hinge 112' on the extension plate allows the locking plate 102' to be adjustably positioned to a selected position (such as the position shown in FIG. 7). In one embodiment, the locking plate 102' may be rotated around the hinge 112' to adjustably position the locking plate 102' into the selected position. In one embodiment, the selected position places the locking plate 102' over the fiber optic connectors 106', which are connected to the fiber optic adapters 107' on the fiber optic adapter panel 108', such that the fiber optic connectors 106' and the fiber optic adapters 107' are covered by the locking plate 102'. The locking plate 102' comprises cut-out areas 109' and finger portions 110' that are configured to allow the fiber optic cables 104A and 104B (and associated boots 105A and 105B, if present) to pass through the cut-out area 109' of the locking plate 102', but does not allow the fiber optic connector(s) 106' to pass through. The size and shape of the cut-out areas 109' and the finger portions 110' may vary, and any size or shape that allows the fiber optic cables 104A and 104B (and any associated boots 105A and 105B) to pass through the cut-out area 109', but prevents the fiber optic connector(s) 106' from passing through the cut-out area 109' of the locking plate 102', is acceptable.

In the embodiment illustrated in FIG. 8, the finger portions 110' may comprise three distinct finger portions 110A, 110B, and 110C. The finger portion 110A may be substantially flat and may extend beyond the fiber optic connectors 106'. The finger portion 110B may be a curved portion in one embodiment. The finger portion 110C may be substantially flat and may extend downward to a position proximate to a base of fiber optic adapter panel 108' (not shown in FIG. 8, but see the base 120 of FIG. 7).

In the embodiment of FIG. 8, when the locking plate 102' has been rotated over the fiber optic connectors 106' and the fiber optic adapters 107' in order to adjustably position the locking plate 102' into the selected position, the fiber optic connectors 106' that are inserted into the fiber optic adapters 107' are held into place, preventing removal of the fiber optic connectors 106'. Likewise, when the locking plate 102' is rotated over the fiber optic connectors 106' and the fiber optic adapters 107' in order to adjustably position the locking plate 102' into the selected position, the insertion of any other fiber optic connectors 106' into unused fiber optic adapters 107' is prevented.

Once the locking plate 102' has been rotated over the fiber optic connectors 106' and the fiber optic adapters 107', the locking plate 102' may be kept in place in the selected position by using a lock 116'. The lock 116' may be similar to the lock 116 disclosed above in FIG. 7.

Referring now to FIG. 7 and FIG. 8, in one embodiment, the locking plate 102' comprises an end plate 122 that extends over and covers the adapter plunger 118 to prevent access to the adapter plunger 118. In this manner, the end plate 122 prevents removal of the entire fiber optic adapter panel 108' from the housing in which it is located. This provides further security for the optical connections.

Figure 9:
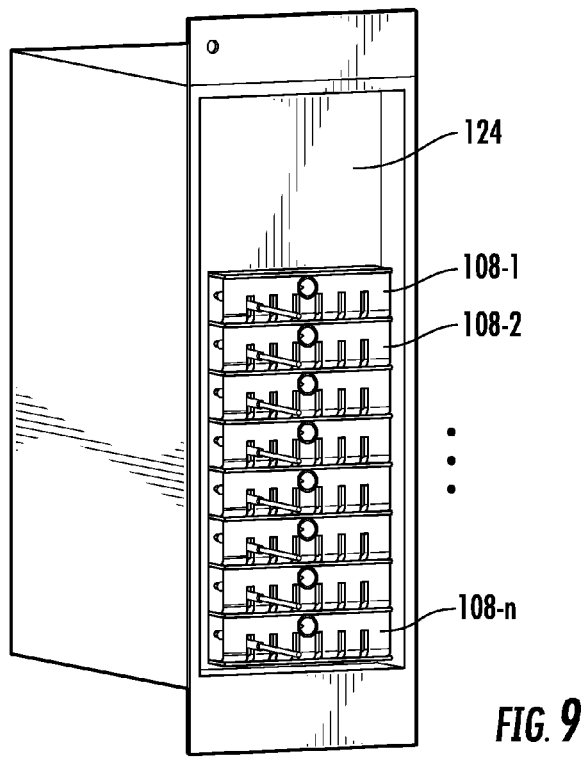
FIG. 9 illustrates a housing with multiple fiber optic adapter panels, each fiber optic adapter panel being secured by a locking mechanism according to one embodiment.

FIG. 9 illustrates a housing with multiple fiber optic adapter panels, each fiber optic adapter panel being secured by a locking mechanism according to one embodiment. A housing 124 may include a plurality of n fiber optic adapter panels 108-1 to 108-n. One or more of the fiber optic adapter panels 108-1 to 108-n may be secured by the locking plate 102 of FIG. 7, or the locking plate 102' of FIG. 8.

One advantage of the disclosed locking mechanisms of FIGS. 7 and 8 is that they may be used for any standard fiber optic connector (including, but not limited to SC, LC, ST, MTP, FC, MU, or MTRJ connectors), which reduces the need for different solutions. FIGS. 10A-10D illustrate some exemplary fiber optic adapter panels which may be secured using the locking mechanisms in FIG. 7 and/or FIG. 8.

Figure 10D:
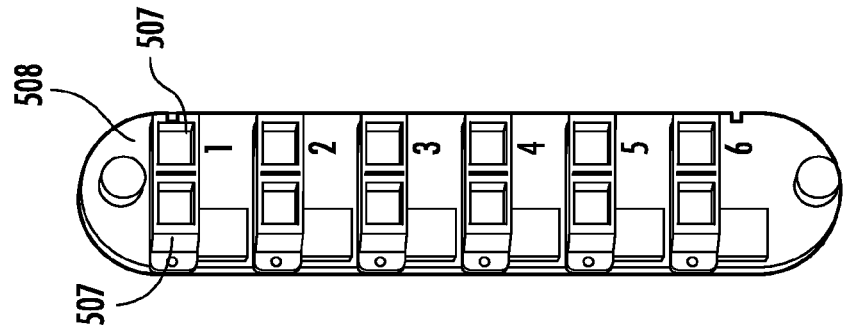
FIG. 10D illustrates another exemplary fiber optic adapter panel according to one embodiment.
Figure 10C:
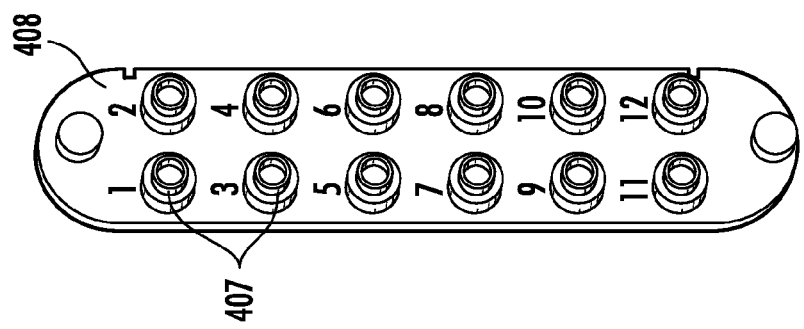
FIG. 10C illustrates another exemplary fiber optic adapter panel according to one embodiment.
Figure 10B:
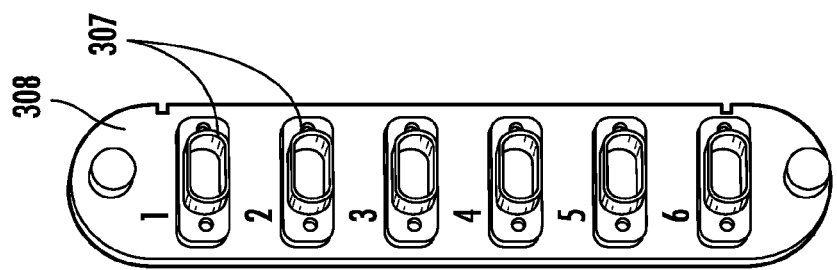
FIG. 10B illustrates another exemplary fiber optic adapter panel according to one embodiment.
Figure 10A:
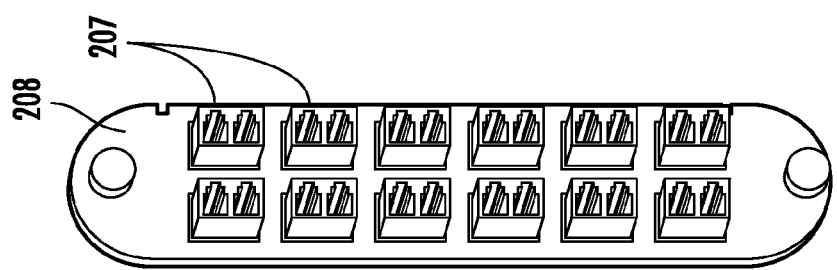
FIG. 10A illustrates an exemplary fiber optic adapter panel according to one embodiment.

FIG. 10A illustrates an exemplary fiber optic adapter panel according to one embodiment. A fiber optic adapter panel 208 is shown in FIG. 10A. The fiber optic adapter panel 208 is a 24-fiber LC duplex connector panel and has twelve (12) duplex fiber optic adapters 207. The fiber optic adapter panel 208 can be used in place of the fiber optic adapter panel 108 of FIG. 7 or the fiber optic adapter panel 108' of FIG. 8.

FIG. 10B illustrates another exemplary fiber optic adapter panel according to one embodiment. A fiber optic adapter panel 308 is shown in FIG. 10B. The fiber optic adapter panel 308 is a 72-fiber MTP connector panel and has six (6) fiber optic adapters 307, each of which can receive a fiber optic connector having twelve (12) optical fibers. The fiber optic adapter panel 308 can be used in place of the fiber optic adapter panel 108 of FIG. 7 or the fiber optic adapter panel 108' of FIG. 8.

FIG. 10C illustrates another exemplary fiber optic adapter panel according to one embodiment. A fiber optic adapter panel 408 is shown in FIG. 10C. The fiber optic adapter panel 408 is a 12-fiber ST compatible connector panel and has twelve (12) fiber optic adapters 407, each of which can receive one (1) fiber optic connector. The fiber optic adapter panel 408 can be used in place of the fiber optic adapter panel 108 of FIG. 7 or the fiber optic adapter panel 108' of FIG. 8.

FIG. 10D illustrates another exemplary fiber optic adapter panel according to one embodiment. A fiber optic adapter panel 508 is shown in FIG. 10D. The fiber optic adapter panel 508 is a 12-fiber SC duplex connector panel and has twelve (12) fiber optic adapters 507, each of which can receive one (1) fiber optic connector. The fiber optic adapter panel 508 can be used in place of the fiber optic adapter panel 108 of FIG. 7 or the fiber optic adapter panel 108' of FIG. 8.

Although the embodiments disclosed in FIGS. 7 and 8 are discussed with respect to fiber optic adapter panels, the locking methods and apparatuses described herein may also be used with "plug and play" fiber optic modules, also sometimes known as cassettes. Thus, for purposes of this Specification, the term "fiber optic adapter panel" may be construed to include fiber optic modules, such as "plug and play" fiber optic modules, or cassettes.

According to another embodiment, a locking apparatus may be used to securely store unused or unconnected ports of an optical splitter in a separate enclosure, such as a parking lot compartment in one embodiment. The apparatus comprises at least one parking lot compartment comprising one or more parking lot adapters or connector holders configured to receive one or more unused or unconnected optical fibers split by an optical splitter. The one or more unused or unconnected optical fibers are parked in the one or more parking lot adapters using one or more respective fiber optic connectors disposed on the end of one or more respective fiber optic cables comprising the one or more unused or unconnected optical fibers. The locking apparatus also comprises a lock configured to prevent access to the one or more parking lot adapters.

In this regard, as shown below in FIGS. 11-13, the disclosed method and apparatus allows open ports of optical splitters in a PON system to be securely stored in a lockable parking lot compartment to reduce the chances of a security breach. This may help solve the potential problem of parking unused or unconnected optical fibers in a simple panel inside the fiber optic terminal that houses the optical splitter, which may allow unauthorized users to "tap" into the PON system. According to the disclosed method, the unused or unconnected optical fibers may be stored in a separate, lockable parking lot compartment until they are needed. Further, in one embodiment, the unused or unconnected optical fibers may be sorted into a plurality of groups and stored in a plurality of lockable parking lot compartments, with each one of the plurality of groups of unused or unconnected optical fibers stored in a different one of the plurality of lockable parking lot compartments. For example, the unused or unconnected optical fibers that originated from the same network may be grouped together. In one embodiment, the different lockable parking lot compartments and optical fibers may be color-coded such that the different networks may be identified. In another embodiment, the locking mechanism may be configured to provide a signal or indication if the locking mechanism is breached or attempted to be breached.

Figure 11:
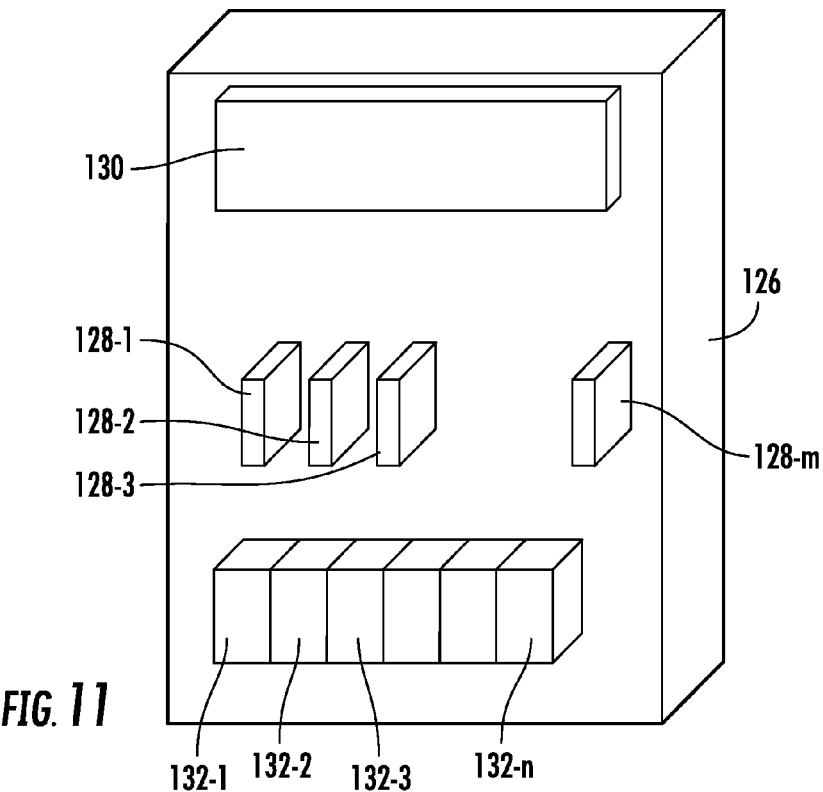
FIG. 11 is a high level view of a fiber optic terminal having multiple optical splitters and parking lot compartments according to one embodiment.

FIG. 11 is a high level view of a fiber optic terminal having multiple optical splitters and parking lot compartments according to one embodiment. A fiber optic terminal 126 comprises one or more optical splitters 128-1 to 128-*m*. The fiber optic terminal 126 also comprises a distribution panel 130 and one or more parking lot compartments 132-1 to 132-*n*. In various embodiments, the number of parking lot compartments 132 can vary between 1 and 128. The location of the optical splitters 128, the parking lot compartments 132 and the distribution panel 130 within the fiber optic terminal 126 relative to each other can vary. In one embodiment, the parking lot compartments 132 may be located in the fiber parking area 75 illustrated in FIG. 2. In another embodiment, the parking lot compartments 132 may be similar to the optical fiber parking area 89 illustrated in FIG. 5.

Figure 12:
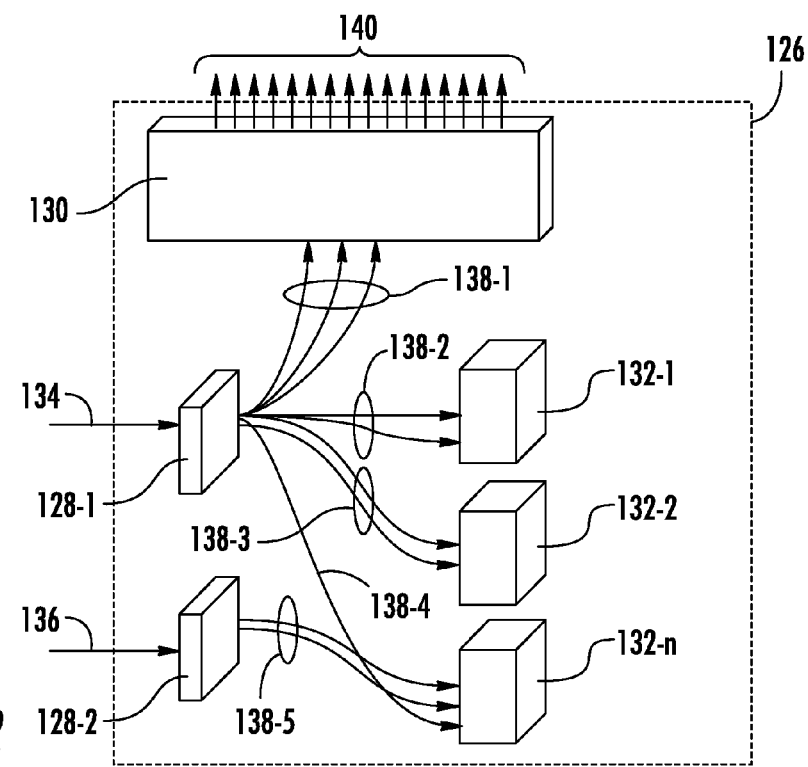
FIG. 12 illustrates how optical fibers may be used or unused after passing through optical splitters in the fiber optic terminal of FIG. 11, according to one embodiment.

FIG. 12 illustrates how optical fibers may be used or unused after passing through the optical splitters 128-1 to 128-*m* in the fiber optic terminal 126 of FIG. 11, according to one embodiment. As seen in FIG. 12, there may be a plurality of input optical fibers 134 and 136 coming into the fiber optic terminal 126. The input optical fiber 134 may come from an Optical Line Terminal (OLT) in a telecommunications room (or building or campus distributor) or via the fiber optic feeder cables 14 from the switching point(s) 12, as shown in FIG. 1. An optical signal may be routed from the OLT via the input optical fiber 134 to the input of the optical splitter 128-1. The optical splitter 128-1 outputs optical fibers that are used and routes them to the distribution panel 130 and ultimately to an Optical Networking Terminal (ONT) of an end user, typically at the subscribers' premises 20. The unused optical fibers are routed to the parking lot compartments 132-1 to 132-*n*.

The signal in the input optical fiber 134 is split by the optical splitter 128-1 into a plurality of optical signals carried by the optical fibers. In one embodiment, the number of optical fibers output from the optical splitter 128-1 is a power of two (2). In one embodiment, as shown in FIG. 12, the signal in the input optical fiber 134 is split by the optical splitter 128-1 into eight (8) optical signals carried by eight (8) optical fibers (a 1×8 optical splitter). A subset of these optical fibers, e.g., three (3) of these fibers in the embodiment shown in FIG. 12, labeled optical fibers 138-1, are connected to the distribution panel 130 to be output as output optical fibers 140 and may be referred to as optical fibers for used ports. In other embodiments, the number of optical fibers connected to the distribution panel 130 may vary, and can be any number. In one embodiment, the optical fibers 140 extend to an end user, such as the end user's desk in an FTTD scenario. The optical fibers that are unused or unconnected to the distribution panel 130 are placed in the parking lot compartments 132-1 to 132-*n*. These optical fibers may be referred to as optical fibers for unused ports. In the embodiment of FIG. 12, two (2) unused optical fibers 138-2 are placed into the parking lot compartment 132-1, two (2) unused optical fibers 138-3 are placed into the parking lot compartment 132-2, and one (1) unused optical fiber 138-4 is placed into the parking lot compartment 132-*n*. In addition, the signal in the input optical fiber 136 is passed through the optical splitter 128-2 and is split into two (2) optical signals carried by two (2) optical fibers 138-5. In the embodiment of FIG. 12, the optical fibers 138-5 are unused and are parked into the parking lot compartment 132-*n*.

The fiber optic terminal 126 may include any number and any type of optical splitters, including but not limited to 1×N or 2×N splitter types, where N=2, 4, 8, 16, 32, 64 or 128. In one embodiment, the number of optical splitters per enclosure may be M, where M is between 1 and 100. In one embodiment, the number of total output ports per fiber optic terminal 126 can vary between 32 and 1728.

Figure 13:
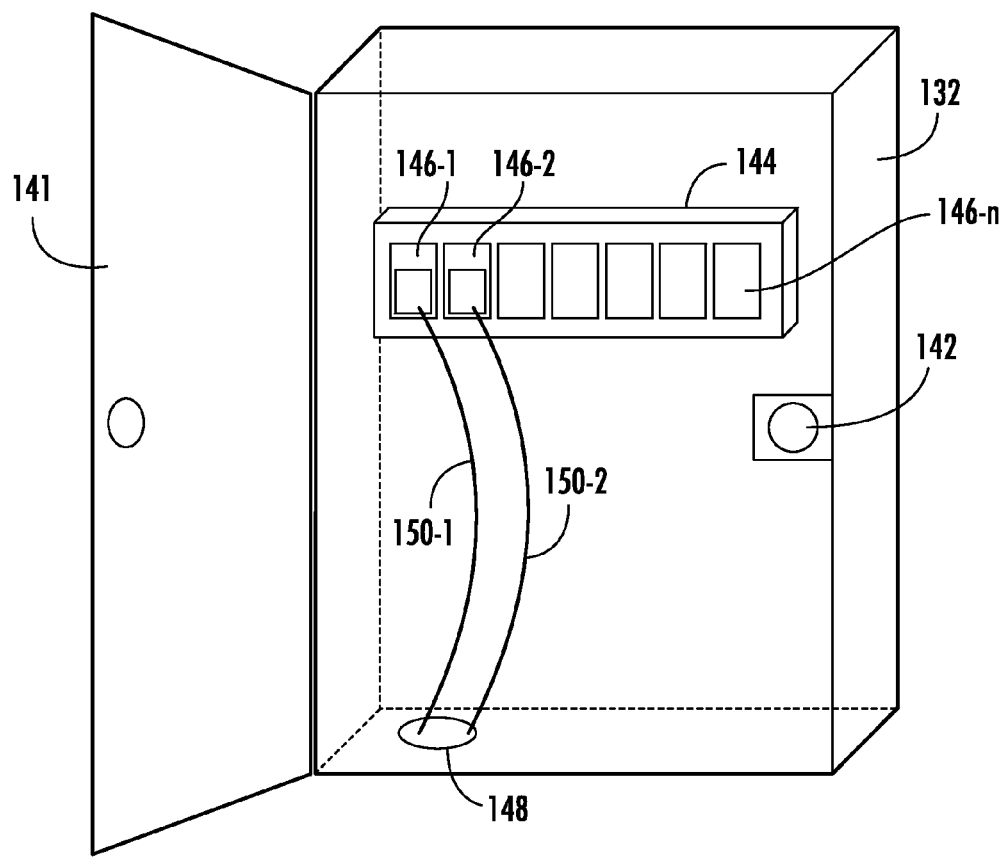
FIG. 13 illustrates parking lot compartments of FIGS. 11 and 12 and how the unused optical fibers may be securely locked in the parking lot compartments according to one embodiment.

FIG. 13 illustrates the parking lot compartments of FIG. 11 and FIG. 12 and how the unused optical fibers may be securely locked in the parking lot compartments according to one embodiment. A parking lot compartment 132 is shown in FIG. 13 and may represent any of the parking lot compartments 132-1 to 132-*n* in FIGS. 11 and 12. A door 141 may be hingedly affixed to the parking lot compartment 132. The door 141 may be made of a rigid material, such as aluminum or other metal, plastic, or thermoplastic, such that the internal components of the parking lot compartment 132 can be protected when the door 141 is closed. In one embodiment, as shown in FIG. 13, a lock 142 is provided in a middle portion of the parking lot compartment 132 to be used in connection with the door 141. The door 141 of the parking lot compartment 132 may be locked using the lock 142 in order to limit access to the parking lot compartment 132. In other embodiments, the lock 142 may take various forms and may be located in various positions. As non-limiting examples, the lock 142 may be located at a top or bottom of the parking lot compartment 132 or the door 141, and may be located near or away from the location where the door 141 may be hingedly affixed to the parking lot compartment 132. In yet another embodiment, the lock 142 may be located on the parking lot panel 144.

The parking lot compartment 132 also comprises a parking lot panel 144 comprising a plurality of parking lot adapters 146-1 to 146-*n* and an entry port 148. In one embodiment, the parking lot panel 144 may be any one of the fiber optic adapter panels discussed above with respect to FIGS. 7, 8, and 10A-10D. Although only a single entry port 148 is shown in FIG. 13, the number of entry ports for optical fiber cables can vary between 1 and 32 (for single-fiber entry). The shape of the entry port 148 may vary, including but not limited to round, oval, and rectangular. The size of the entry port 148 may also vary. The number of parking lot adapters 146 per parking lot compartment 132 can vary between 1 and 128 to allow single connector security in one embodiment. Thus, the number of optical fibers and parking lots inside the fiber optic terminal 126 can vary between 1 and 1728.

The parking lot adapters 146-1 to 146-n may be configured to connect to any standard fiber optic connector (including, but not limited to SC, LC, ST, MTP, FC, ST, MU, or MTRJ connectors). The unused optical fibers 138-2, 138-3, 138-4, and 138-5 can be placed into the parking lot compartment 132 through the entry port 148 and then parked in the parking lot panel 144. The unused optical fibers 138-2, 138-3, 138-4, and 138-5 may be parked by connecting appropriate optical fiber connectors on the end of the unused optical fibers 138-2, 138-3, 138-4, and 138-5 and connecting the optical fiber connectors to one or more of the plurality of parking lot adapters 146-1 to 146-n of the parking lot panel 144. In the embodiment of FIG. 13, two (2) of the unused optical fibers 138-1 to 138-5 from FIG. 12 (labeled as 150-1 and 150-2 in FIG. 13) enter the entry port 148 and are parked into parking lot adapters 146-1 and 146-2.

In one embodiment, the door 141 may be closed and locked using the lock 142. In this manner, access to the unused fibers 140-1 and 140-2 parked in the parking lot compartment 132 is limited. The lock 142 may be any lock that prevents the door 141 from being opened. The lock 142 may be individually keyed such that each parking lot compartment 132 requires its own key, or in the alternative, a standard key may be used for all parking lot compartments in a particular fiber optic terminal or space.

In another embodiment, the locking mechanisms shown in FIGS. 7 and 8 may be used to prevent access to the parking lot compartment 132. In one embodiment, the parking lot panel 144 of the parking lot compartment 132 may be any one of the fiber optic adapter panels discussed above with respect to FIGS. 7, 8, and 10A-10D. A locking plate similar to the locking plate 102 in FIG. 7 or the locking plate 102' in FIG. 8 may be connected to the parking lot panel 144 in a similar manner as the locking plate 102 was connected to the fiber optic adapter panel 108 or the locking plate 102' was connected to the fiber optic adapter panel 108'.

By providing parking lot compartments that may be lockable, security can be provided such that access to the unused or unconnected optical fibers in a fiber optic terminal in a PON system is limited. In one embodiment, the lock 142 or the locking plate 102 may be monitored electronically or optically for security reasons. In another embodiment, the locking mechanism may be configured to provide a signal or indication if the locking mechanism is breached or attempted to be breached.

Further, in one embodiment, the unused or unconnected ports may be sorted into a plurality of groups and stored in a plurality of lockable parking lot compartments, with each one of the plurality of groups of unused or unconnected ports stored in a different one of the plurality of lockable parking lot compartments. For example, the unused or unconnected ports that originated from the same network may be grouped together. In another embodiment, one or more of the parking lot compartments 132 may be color-coded to identify different physical networks. The color code of the parking lot compartment 132 may match the color code of the distribution panel 130. In addition, the optical splitter 128 and/or the splitter output legs can be color-coded. This color code can match the parking lot compartment and/or the distribution panel color code. In another embodiment, one or more of the parking lot compartments 132 may be coded other than by color to identify different physical networks. As one non-limiting example, one or more of the parking lot compartments 132 may be coded using a numbering scheme to identify the different physical networks and related components.

The locking methods and apparatuses described herein may also be used to secure fiber optic adapters to wall outlets or other fiber optic adapter panels where fiber optic connections are made using fiber optic adapters. In addition, the locking methods and apparatuses described herein could also be used to secure copper connectors as well.

Figure 14:
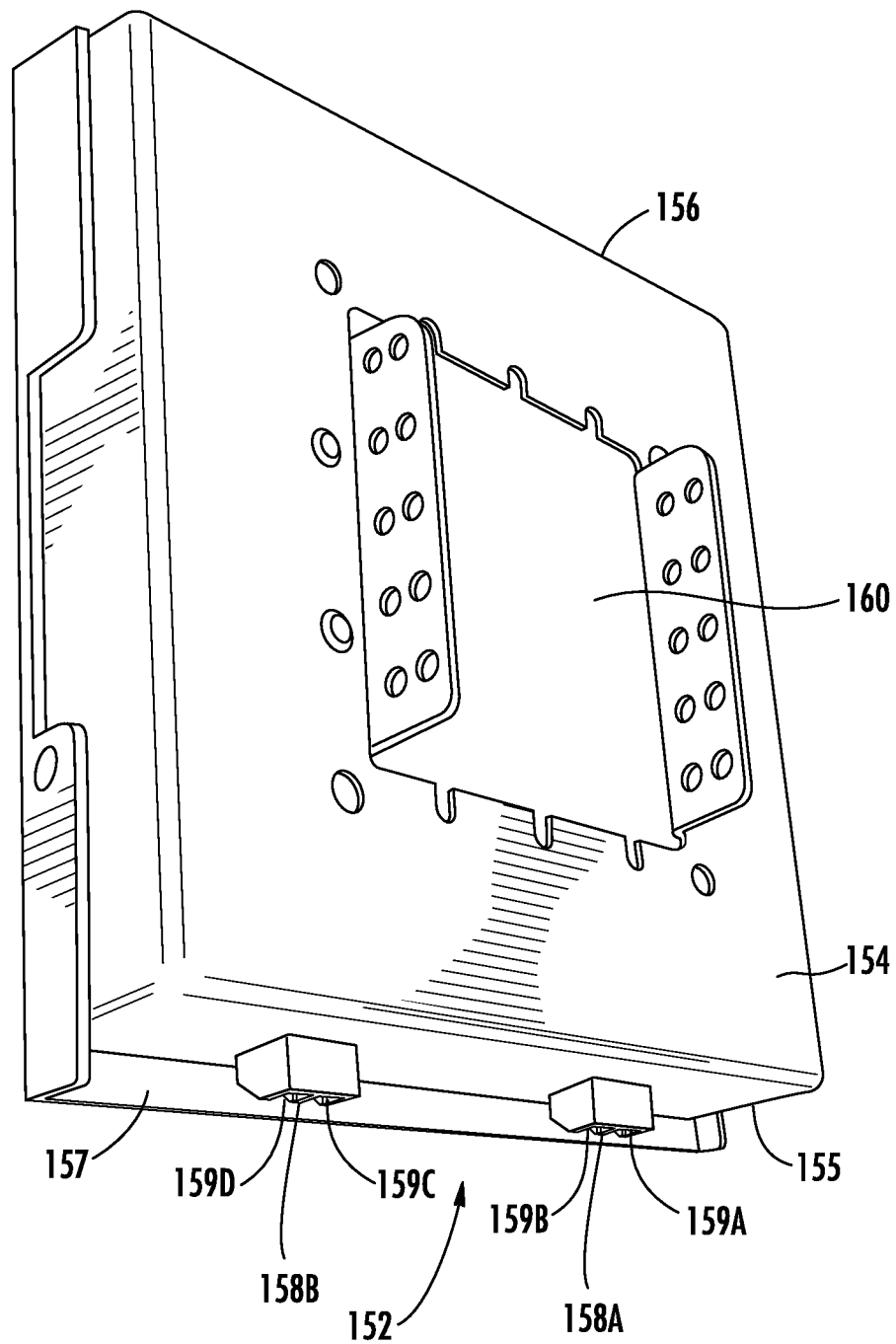
FIG. 14 illustrates an exemplary wall outlet box according to one embodiment.

For example, wall outlets for connection to individual desktops may be used in fiber-to-the-desk (FTTD) applications. FIG. 14 illustrates an exemplary wall outlet box according to one embodiment. In one embodiment, a wall outlet box 152 may be configured to be mounted on a wall such that it covers a standard wall outlet. The wall outlet box 152 of FIG. 14 has a front portion (not shown) and a back portion 154. The wall outlet box 154 has a bottom portion 155 and a top portion 156. In one embodiment, the wall outlet box may have a cover 157, which may be configured to be selectively opened to allow access to an interior portion (not shown) of the wall outlet box 152. The wall outlet box 152 may have one or more fiber optic adapters 158A and 158B located on the bottom portion 155 of the wall outlet box 152. Although the wall outlet box 152 in FIG. 14 shows two (2) fiber optic adapters 158A and 158B located on the bottom portion 155 of the wall outlet box 152, in other embodiments, the wall outlet box 152 may contain any number of fiber optic adapters and they be located at various locations on the wall outlet box 152. The fiber optic adapters 158A may have one or more openings 159A and 159B configured to receive fiber optic connectors on an end of a fiber optic cable. Likewise, fiber optic adapter 158B may have one or more openings 159C and 159D configured to receive fiber optic connectors on an end of a fiber optic cable. Although the fiber optic adapters 158A and 158B shown in FIG. 14 show two (2) openings each, in other embodiments, the fiber optic adapters 158A and 158B may have a different number of openings, including but not limited to a single opening. The wall outlet box 152 may have an opening 160 configured to allow fiber optic cables to be deployed into the wall outlet box 152.

Figure 15:
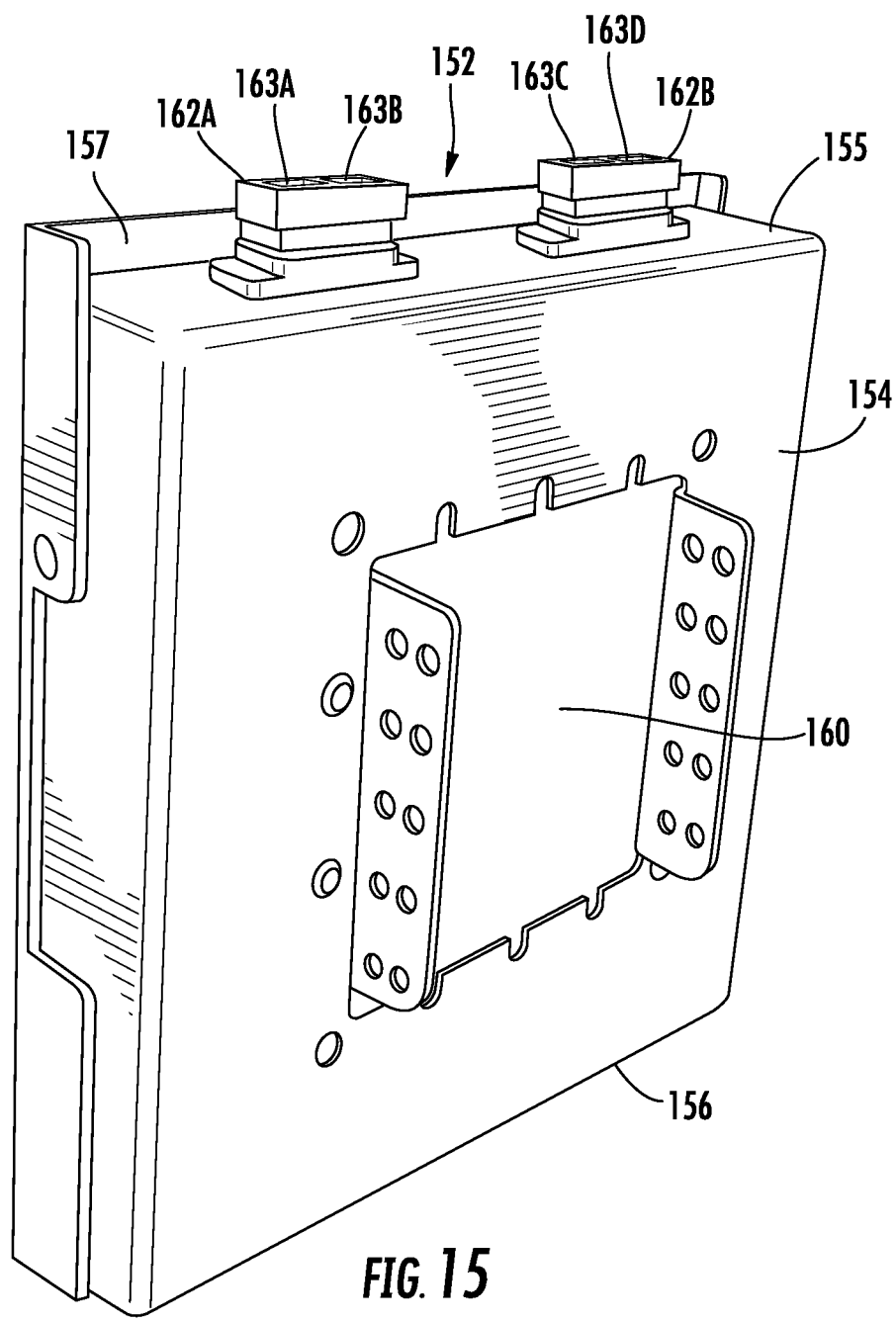
FIG. 15 illustrates another exemplary wall outlet box according to one embodiment (turned so a bottom portion of the wall outlet box is at the top of FIG. 15)

The fiber optic adapters 162A and 162B on the wall outlet box 152 may be any type of fiber optic adapter and may be configured to receive any type of fiber optic connector on an end of a fiber optic cable. FIG. 15 illustrates another exemplary wall outlet box (turned so a bottom portion of the wall outlet box is at the top of FIG. 15) according to one embodiment. In the embodiment illustrated in FIG. 15, another type of fiber optic adapters 162A and 162B is shown. Although the wall outlet box 152 in FIG. 15 shows two (2) fiber optic adapters 162A and 162B located on the bottom portion 155 of the wall outlet box 152, in other embodiments, the wall outlet box 152 may contain any number of fiber optic adapters and they may be located at various locations on the wall outlet box 152. The fiber optic adapter 162A may have one or more openings 163A and 163B configured to receive fiber optic connectors on an end of a fiber optic cable. Likewise, the fiber optic adapter 162B may have one or more openings 163C and 163D configured to receive fiber optic connectors on an end of a fiber optic cable. Although the fiber optic adapters 162A and 162B shown in FIG. 15 show two (2) openings each, in other embodiments, the fiber optic adapters 162A and 162B may have a different number of openings, including but not limited to a single opening.

Figure 16:
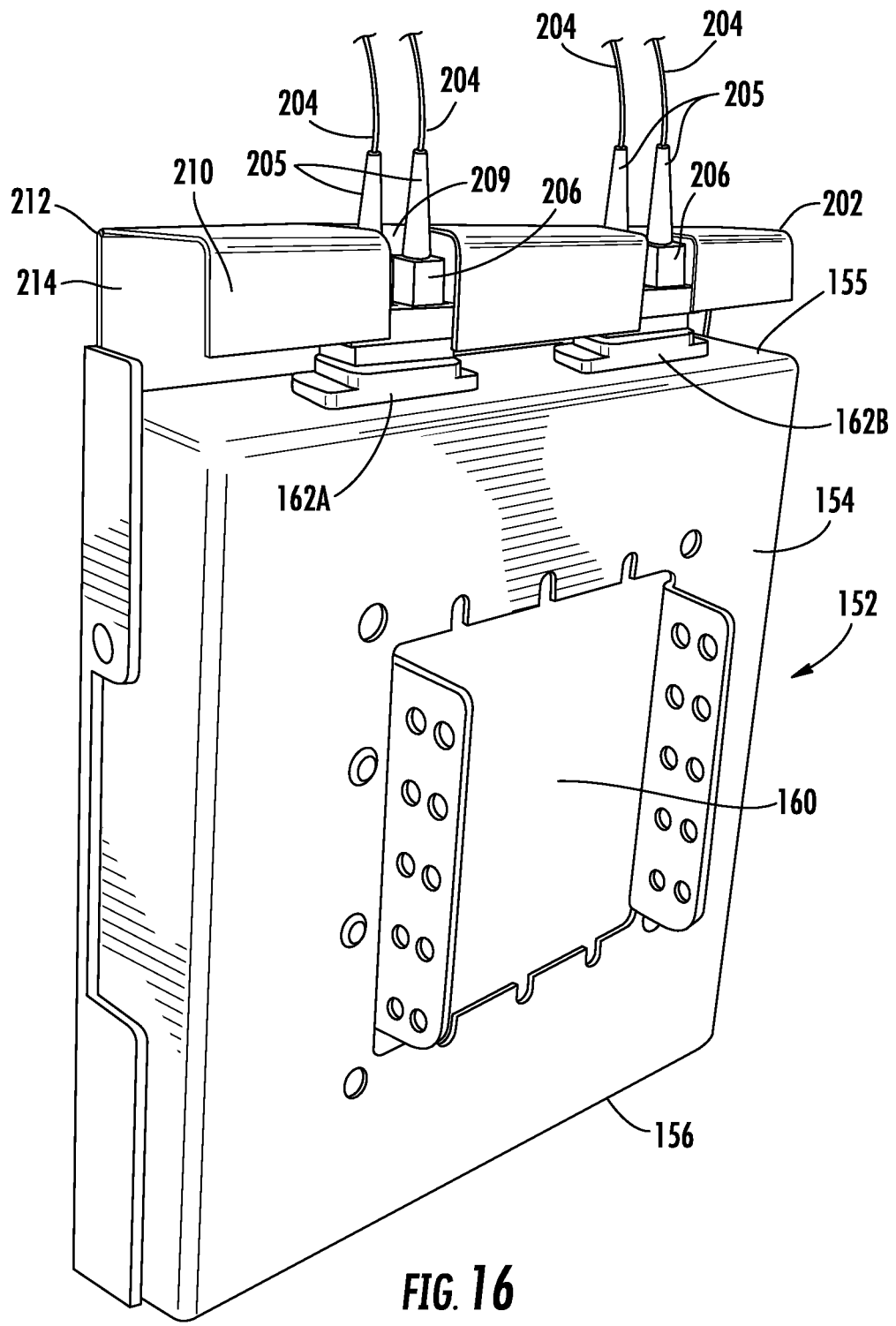
FIG. 16 illustrates the wall outlet box of FIG. 15 having fiber optic connections being secured by a locking mechanism according to one embodiment.

FIG. 16 illustrates the wall outlet box of FIG. 15 having fiber optic connections being secured by a locking mechanism according to one embodiment. A locking plate 202 may be attached to the wall outlet box 152. In one embodiment, the locking plate 202 may be attached to the bottom portion 155 of the wall outlet box 152. In one embodiment, the locking plate 202 may be made of a rigid material, such as a metal (including, but not limited to aluminum), plastic, or thermoplastic. In the embodiment of FIG. 16, one or more fiber optic cables 204, each of which may have a boot 205, is connected to a fiber optic connector 206. In the embodiment of FIG. 16, there are two (2) fiber optic cables 204, but any number may be used. The fiber optic cables 204 may be connected to the fiber optic adapters 162A and 162B, respectively by connecting the fiber optic connectors 206 on the ends of the fiber optic cables 204 to the fiber optic adapters 162A and 162B. The fiber optic cables 204 may comprise at least one optical fiber.

The locking plate 202 may comprise cut-out areas 209 and finger portions 210 in one embodiment. The locking plate 202 may be affixed to the wall outlet box 152. In one embodiment, the locking plate 202 is hingedly affixed by way of a hinge 212 to an extension plate 214, which is affixed to the wall outlet box 152. The extension plate 214 may be made of a rigid material, such as a metal (including, but not limited to aluminum), plastic, or thermoplastic. The locking plate 202 and/or the extension plate 214 may be formed at the same time as the wall outlet box 152 as a unitary piece in one embodiment. In another embodiment, the extension plate 214 may be attached to the wall outlet box 152 via a welding process. The extension plate 214 may be attached at an angle to the bottom portion 155 of the wall outlet box 152. In one embodiment, this angle may be at or about ninety (90) degrees. Although the extension plate 214 is shown in FIG. 16 as being attached to the bottom portion 155 of the wall outlet box 152, the extension plate 214 may be attached to the wall outlet box 152 at other locations or via other means.

The hinge 212 on the extension plate 214 allows the locking plate 202 to be adjustably positioned to a selected position (such as the position shown in FIG. 16). In one embodiment, the locking plate 202 may be rotated around the hinge 212 to adjustably position the locking plate 202 into the selected position. In one embodiment, the selected position places the locking plate 202 over the fiber optic connectors 206, which are connected to the fiber optic adapters 162A and 162B such that the fiber optic connectors 206 and the fiber optic adapters 162A and 162B are covered by the locking plate 202. In the selected position, a technician or other person would not have access to the connection between the fiber optic connectors 206 and the fiber optic adapters 162A and 162B.

The cut-out areas 209 and the finger portions 210 of the locking plate 202 are configured to allow the fiber optic cables 204 (and associated boot 205, if present) to pass through the cut-out area 209 of the locking plate 202 when the locking plate 202 is in the selected position. However, when the locking plate 202 is in the selected position, the finger portion 210 of the locking plate 202 does not allow the fiber optic connectors 206 to pass through the cut-out areas 209. The size and shape of the cut-out areas 209 and the finger portions 210 may vary, and any size or shape that allows the fiber optic cables 204 (and any associated boot 205) to pass through the cut-out areas 209, but prevents the fiber optic connectors 206 from passing through the cut-out areas 209 of the locking plate 202, is acceptable. When the locking plate 202 has been rotated over the fiber optic connectors 206 and the fiber optic adapters 162A and 162B in order to adjustably position the locking plate 202 into the selected position, the fiber optic connectors 206 that are inserted into the fiber optic adapters 162A and 162B are held into place, preventing removal of the fiber optic connectors 206. Likewise, when the locking plate 202 is in the selected position such that it covers the fiber optic connectors 206 and the fiber optic adapters 162A and 162B, the insertion of any additional fiber optic connectors 206 into unused fiber optic adapters 162A and 162B is prevented.

Once the locking plate 202 has been rotated over the fiber optic connectors 206 and the fiber optic adapters 162A and 162B in order to adjustably position the locking plate 202 into the selected position, the locking plate 202 may be kept in place by using a lock similar to lock 116 described above with respect to FIGS. 7 and 8. In another embodiment, the locking plate 202 may be kept in place in the selected position using a screw or other fastening means.

The disclosed apparatuses and method allow fiber optic connectors to be locked in or out of a fiber optic adapter panel or other fiber optic module. One advantage of the disclosed locking mechanism is that it may be used for any standard fiber optic connector (including, but not limited to SC, LC, ST, MTP, etc.), which reduces the need for different solutions. In addition, the locking apparatus can be used as both a lock-in and lock-out device, instead of requiring different devices for each function.

In one embodiment, the lock may be individually keyed for per-panel security such that each panel requires its own key, or in the alternative, a standard key may be used for all fiber optic adapter panels in a particular fiber optic terminal or space.

By using the disclosed locking methods and apparatuses, fiber optic adapter panels, fiber optic terminals, fiber optic modules, and/or fiber optic connections can be made secure.

As used herein, the term "fiber optic terminal" is intended to include any type of fiber optic terminal. For example, the fiber optic terminal as used herein can be a splice terminal, patch terminal or the like, or any combination thereof. The adapter panels provided in one or more adapter modules in a fiber optic terminal are not limited to provide fiber optic adapters. If fiber optic adapters are provided, the fiber optic adapters may be for any type of optical connector, including but not limited to an LC, SC, MTP, FC, ST, MU, or MTRJ, without limitation.

The fiber optic terminals disclosed herein may be used for any type of fiber optic terminal, including but not limited to local convergence points (LCPs) and fiber distribution terminals (FDTs). For example, if the fiber optic terminal is configured as an LCP, the network-side or upstream cable may be a feeder cable from a central office or switching point. The subscriber-side or downstream cable may be a distribution cable. If the fiber optic terminal is configured as an FDT, the network-side or upstream cable may be a distribution cable, and a subscriber-side or downstream cable may be a drop cable. The drop cable may then be routed to an end subscriber(s) for FTTx applications.

The fiber optic terminals disclosed herein may be used for any fiber optic distribution application, including but not limited to directly or intermediately routing fiber optic cables and optical fibers from a fiber optic network(s) to end subscribers, including but not limited to various fiber-to-the-premises (FTTP), fiber-to-the-home (FTTH), and other fiber initiatives (generally described as FTTx). Subscriber premises include, but are not limited to, single-dwelling units (SDU), multi-dwelling units (MDU), businesses, and/or other facilities or buildings, as well as wall outlets for connection to individual desktops (e.g., in fiber-to-the-desk (FTTD) applications).

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163.

Although the present invention has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the present invention and are intended to be covered by the appended claims. It will also be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An apparatus for securing fiber optic connections comprising:
    a locking plate comprising at least one cut-out area and at least one finger portion; and
    wherein the locking plate is configured to be adjustably positioned in a selected position such that when a fiber optic connector on an end of a fiber optic cable is connected to at least one fiber optic adapter, the fiber optic cable is allowed to pass through the at least one cut-out area of the locking plate but the at least one finger portion of the locking plate does not allow the fiber optic connector to pass through the at least one cut-out area of the locking plate; and
    a lock disposed on the locking plate configured to keep the locking plate in the selected position after the locking plate has been adjustably positioned in the selected position.

2. The apparatus of claim 1, wherein the locking plate is further configured to be attached to a fiber optic adapter panel having a plurality of fiber optic adapters disposed thereon, wherein at least one fiber optic adapter of the plurality of fiber optic adapters is configured to be connected to the fiber optic connector disposed on the end of the fiber optic cable.

3. The apparatus of claim 2, wherein the locking plate is hingedly attached to the fiber optic adapter panel such that the locking plate is configured to be movable to the selected position.

4. The apparatus of claim 2, wherein the locking plate is hingedly attached to an extension plate that is affixed to the fiber optic adapter panel at an angle at or about ninety (90) degrees.

5. The apparatus of claim 2, wherein the fiber optic adapter panel is a duplex fiber optic adapter panel and one or more of the plurality of fiber optic adapters are configured to be connected to one or more respective fiber optic connectors disposed on an end of one or more respective fiber optic cables; and
    wherein the one or more respective fiber optic cables are allowed to pass through the cut-out area of the locking plate but the at least one finger portion of the locking plate does not allow the one or more respective fiber optic connectors to pass through the cut-out area of the locking plate.

6. The apparatus of claim 5, wherein when the locking plate is in the selected position, additional fiber optic connectors other than the one or more respective fiber optic connectors cannot be connected to any one of the plurality of fiber optic adapters.

7. The apparatus of claim 2, wherein the fiber optic adapter panel further comprises an adapter plunger configured to be selectively actuated to allow the fiber optic adapter panel to be removed from a housing in which the fiber optic adapter panel is located.

8. The apparatus of claim 7, wherein the locking plate further comprises an end plate that covers the adapter plunger to prevent access to the adapter plunger in order to prevent removal of the fiber optic adapter panel from the housing.

9. The apparatus of claim 2, wherein the fiber optic adapter panel is part of a parking lot compartment for parking fiber optic cables.

10. The apparatus of claim 1, wherein when the locking plate is in the selected position, additional fiber optic connectors are prevented from being connected to any one of the plurality of fiber optic adapters.

11. The apparatus of claim 1, wherein the lock has a unique key.

12. The apparatus of claim 1, wherein the fiber optic connector is of a type of fiber optic connector selected from a group comprising: LC connectors, SC connectors, ST connectors, MTP connectors, FC connectors, MU connectors, and MTRJ connectors.

13. The apparatus of claim 1, wherein the at least one fiber optic adapter is located on a wall outlet box, and wherein the locking plate is attached to the wall outlet box.

14. A method for securing fiber optic connections, comprising:
    providing a locking plate comprising at least one cut-out area and at least one finger portion;
    positioning the locking plate in a selected position such that when a fiber optic connector on an end of a fiber optic cable is connected to at least one fiber optic adapter, the fiber optic cable is allowed to pass through the at least one cut-out area of the locking plate but the fiber optic connector is not allowed to pass through the at least one cut-out area of the locking plate; and
    providing a lock disposed on the locking plate, the lock configured to keep the locking place in the selected position.

15. The method of claim 14, wherein the locking plate is further configured to be attached to a fiber optic adapter panel having the at least one fiber optic adapter disposed thereon.

16. The method of claim 14, further comprising connecting the at least one fiber optic adapter to the fiber optic connector prior to positioning the locking plate in the selected position.

17. The method of claim 15, wherein the fiber optic adapter panel is part of at least one parking lot compartment, the method further comprising:
    parking one or more unused or unconnected optical fibers split by an optical splitter in one or more parking lot adapters in the at least one parking lot compartment by connecting the one or more parking lot adapters to one or more respective fiber optic connectors disposed on an end of one or more respective fiber optic cables comprising one or more unused or unconnected optical fibers.

18. The method of claim 16, wherein the parking is done prior to positioning the locking plate in the selected position.

19. The method of claim 14, further comprising electronically or optically monitoring the lock.

* * * * *